US012666263B2

(12) United States Patent
Gupta et al.

(10) Patent No.: US 12,666,263 B2
(45) Date of Patent: Jun. 23, 2026

(54) MULTI-FACTOR AUTHENTICATION BASED CELLULAR WIRELESS SERVICE TRANSFER WITH ACCOUNT OWNER CONSENT

(71) Applicant: Apple Inc., Cupertino, CA (US)

(72) Inventors: Suraj Gupta, Santa Clara, CA (US); Hyewon Lee, Cupertino, CA (US); Raj S. Chaugule, San Jose, CA (US); Samy Touati, Pleasanton, CA (US); Sherman X. Jin, Santa Clara, CA (US); Zexing Shi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 305 days.

(21) Appl. No.: 18/531,674

(22) Filed: Dec. 6, 2023

(65) Prior Publication Data

US 2025/0193668 A1      Jun. 12, 2025

(51) Int. Cl.
| | |
|---|---|
| *H04W 12/06* | (2021.01) |
| *H04W 8/20* | (2009.01) |
| *H04W 8/26* | (2009.01) |
| *H04W 12/72* | (2021.01) |

(52) U.S. Cl.
CPC ......... *H04W 12/068* (2021.01); *H04W 8/205* (2013.01); *H04W 8/265* (2013.01); *H04W 12/72* (2021.01)

(58) Field of Classification Search
CPC ... H04W 12/068; H04W 8/205; H04W 8/265; H04W 12/72; H04W 12/35
USPC ........................................................ 455/511
See application file for complete search history.

(56) References Cited

U.S. PATENT DOCUMENTS

| | | | |
|---|---|---|---|
| 2016/0253650 A1* | 9/2016 | Cohen ................. | G06Q 20/407 |
| | | | 705/44 |
| 2020/0137566 A1 | 4/2020 | Jin et al. | |
| 2021/0076195 A1* | 3/2021 | Chaugule .............. | H04W 12/40 |
| 2021/0076204 A1* | 3/2021 | Goyal ................... | H04L 67/306 |
| 2022/0038887 A1 | 2/2022 | Chaugule et al. | |
| 2022/0104005 A1 | 3/2022 | Xiong et al. | |

OTHER PUBLICATIONS

PCT Patent Application No. PCT/US2024/052344—International Search Report and Written Opinion dated Jan. 30, 2025.

* cited by examiner

*Primary Examiner* — Don N Vo
(74) *Attorney, Agent, or Firm* — DICKINSON WRIGHT RLLP

(57) ABSTRACT

The described embodiments set forth techniques for transferring cellular wireless service from a source wireless device to a target wireless device with multi-factor authentication and consent of a mobile network operator (MNO) account owner of a multi-user MNO account that includes one or more MNO account members. Terms and conditions for transfer of the cellular wireless service can be presented via a native operating system user interface of a wireless device of the MNO account owner. When the target wireless device belongs to an MNO account member, the MNO account owner wireless device facilitates transfer of the cellular wireless service by allowing the MNO account owner to review terms and conditions and provide one-time passcode authentication to the target wireless device. An original equipment manufacturer (OEM) cloud network service can be used for transfer of terms and conditions information and/or the one-time passcode.

20 Claims, 19 Drawing Sheets

| MOBILE NETWORK OPERATOR | ⟷ | MNO PROVISIONING SERVER |
|---|---|---|
| 114 | | 116 |

BASE STATION 112-1    BASE STATION 112-2    BASE STATION 112-N

• • •

WIRELESS DEVICE 102

MEMORY 106

PROCESSOR(S) 104

EUICC 108

BASEBAND WIRELESS CIRCUITRY 110

UICC 118

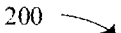
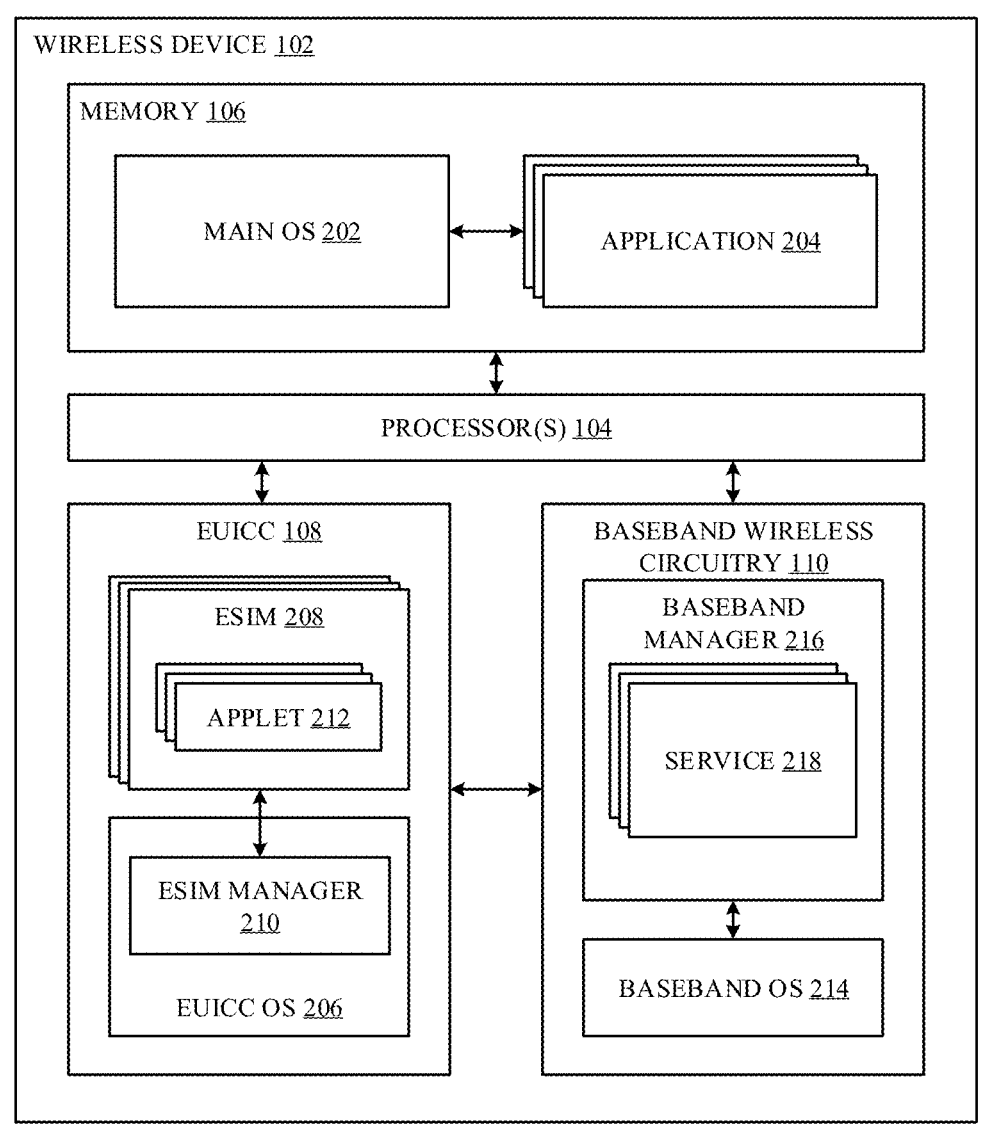
*FIG. 2*

CELLULAR WIRELESS SERVICE PLAN TRANSFER MECHANISMS (I)
300
UICC (Physical SIM Card) Transfer
Between Linked or Non-Linked Devices
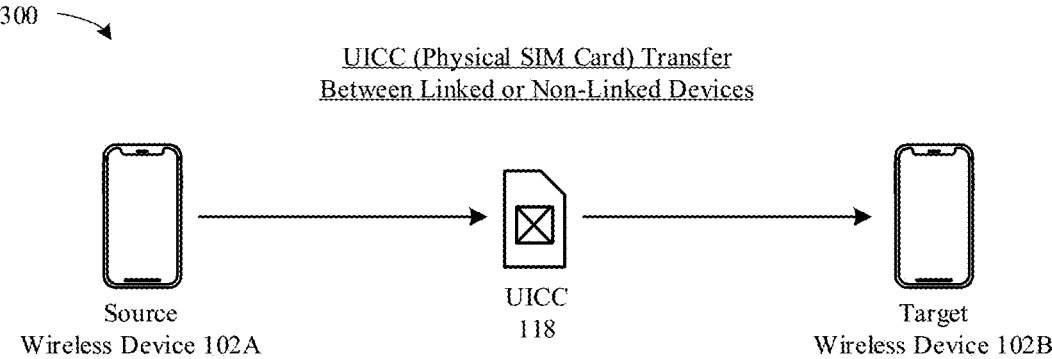
320
SIM/ESIM Cellular Wireless Service Plan Transfer
Between Cloud Network Service Linked Devices
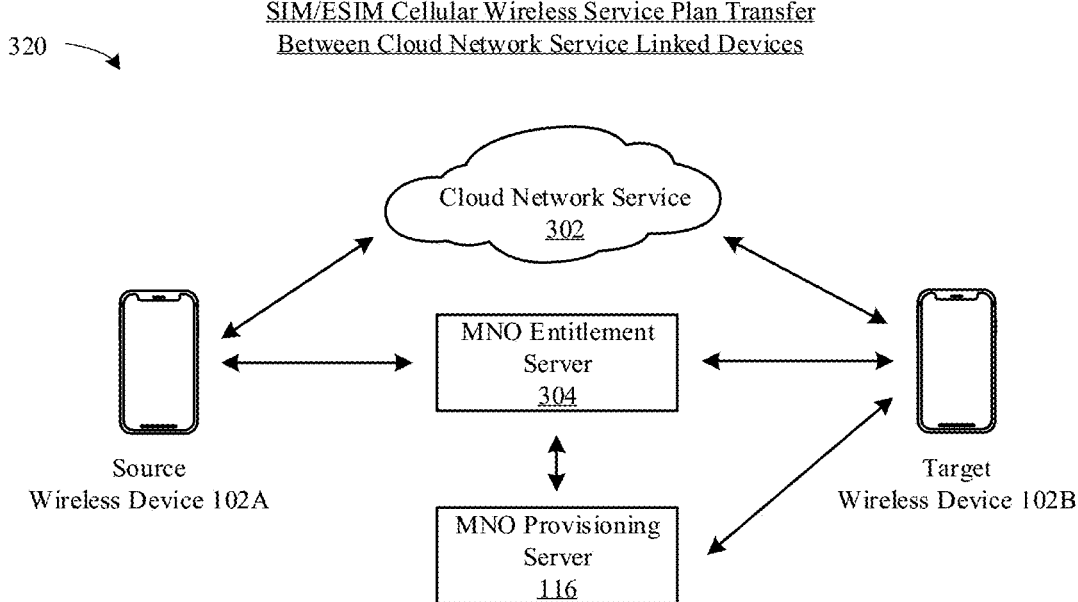
*FIG. 3A*

CELLULAR WIRELESS SERVICE PLAN TRANSFER MECHANISMS (II)
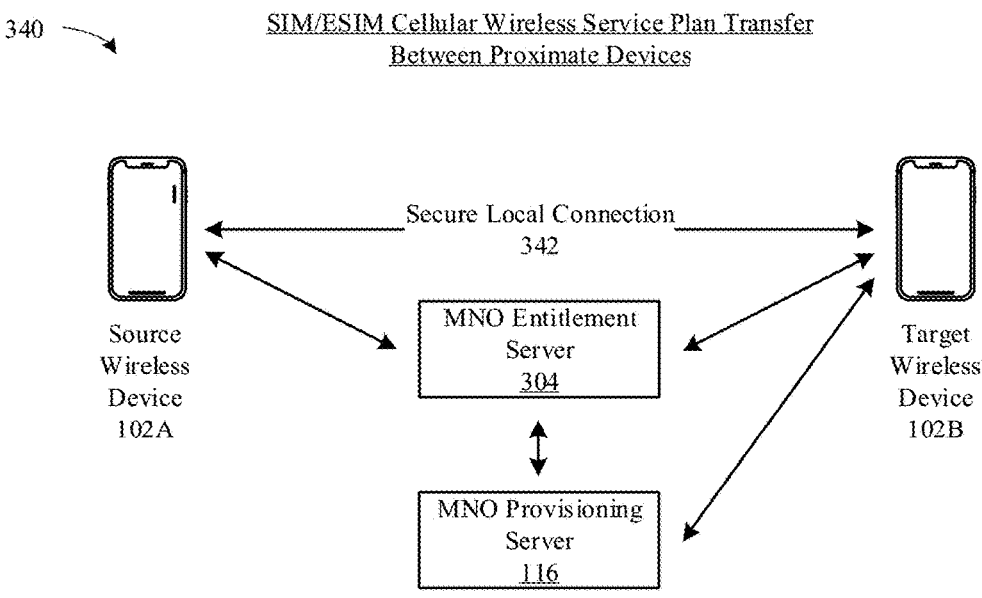
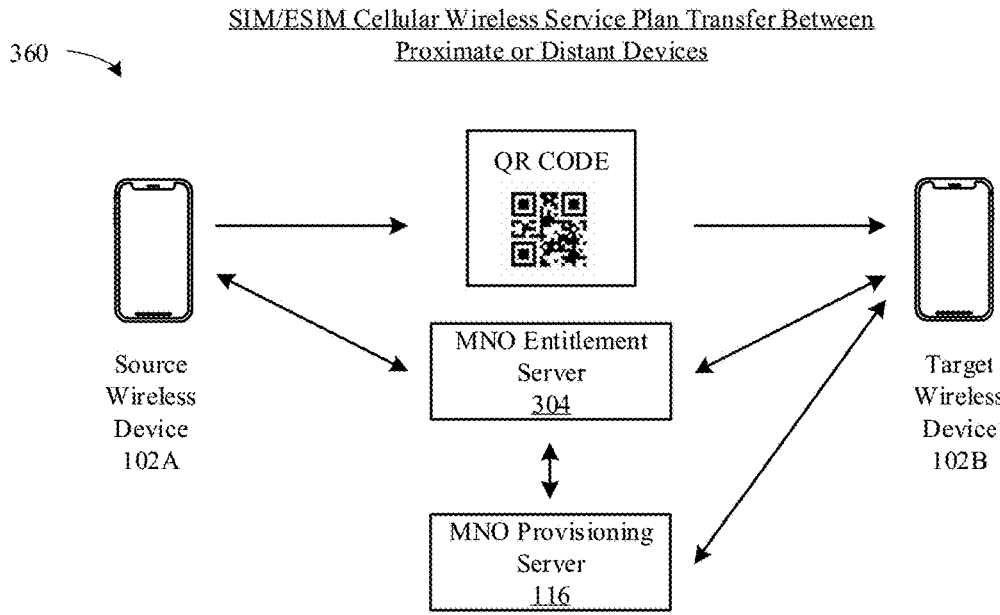
*FIG. 3B*

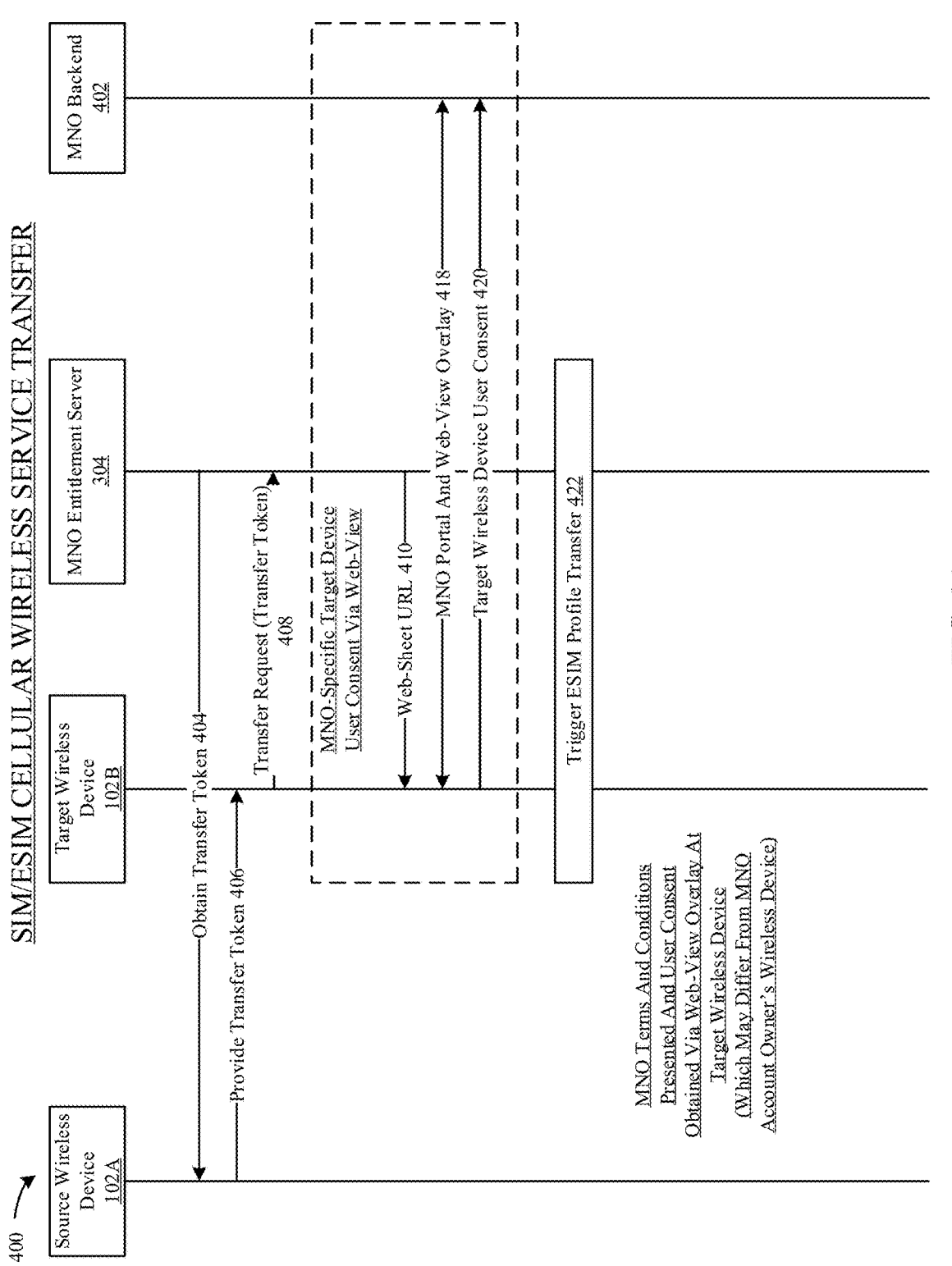

SIM/ESIM CELLULAR WIRELESS SERVICE TRANSFER

Source Wireless Device 102A

Target Wireless Device 102B

MNO Entitlement Server 304

MNO Backend 402

400

Obtain Transfer Token 404

Provide Transfer Token 406

Transfer Request (Transfer Token) 408

MNO-Specific Target Device User Consent Via Web-View

Web-Sheet URL 410

MNO Portal And Web-View Overlay 418

Target Wireless Device User Consent 420

Trigger ESIM Profile Transfer 422

MNO Terms And Conditions Presented And User Consent Obtained Via Web-View Overlay At Target Wireless Device (Which May Differ From MNO Account Owner's Wireless Device)

FIG. 4A

SIM/ESIM CELLULAR WIRELESS SERVICE TRANSFER (MNO ACCOUNT OWNER)

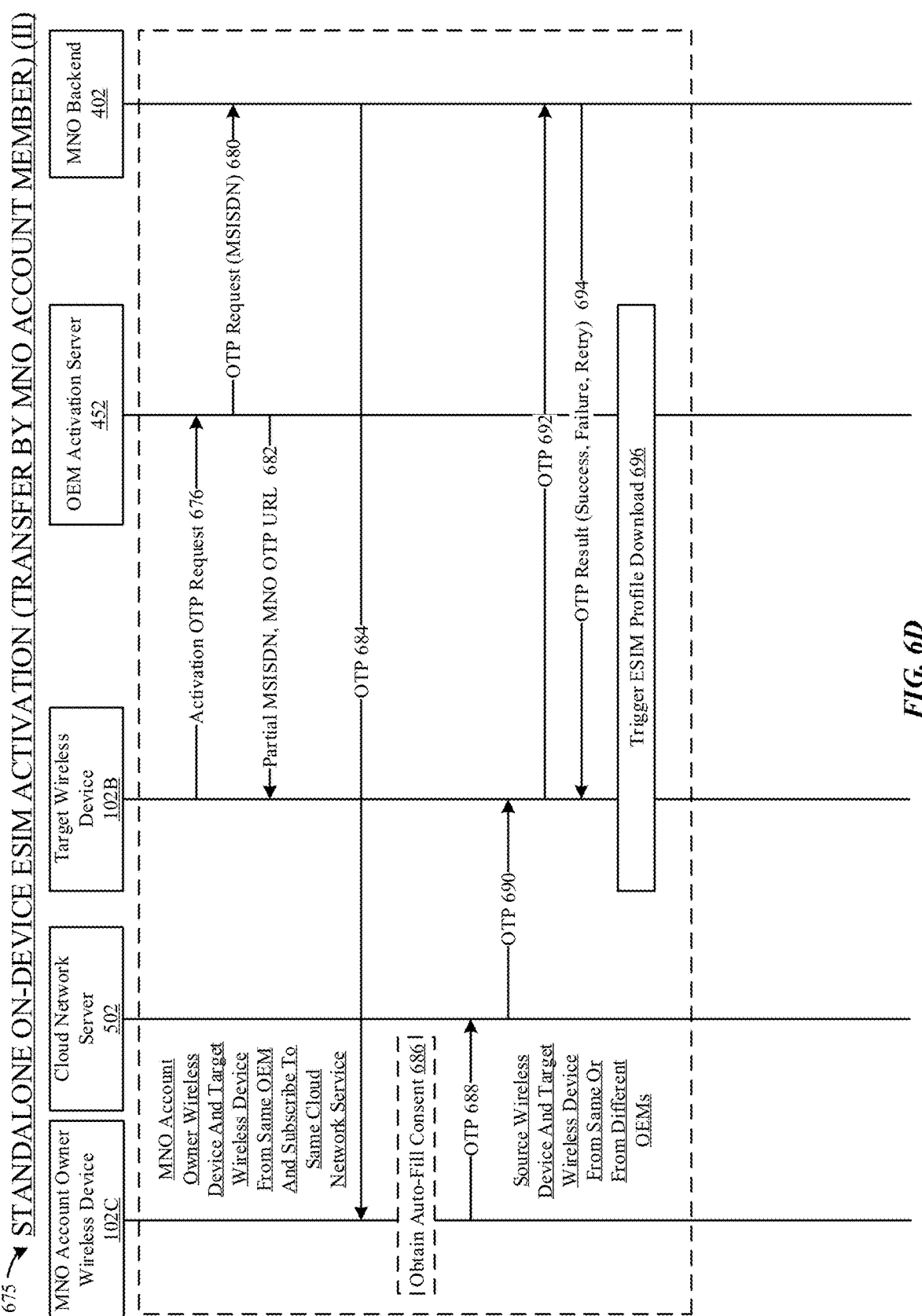

STANDALONE ON-DEVICE ESIM ACTIVATION (TRANSFER BY MNO ACCOUNT MEMBER) (II)

675

MNO Account Owner Wireless Device 102C

Cloud Network Server 502

Target Wireless Device 102B

OEM Activation Server 452

MNO Backend 402

MNO Account Owner Wireless Device And Target Wireless Device From Same OEM And Subscribe To Same Cloud Network Service Activation OTP Request 676

OTP Request (MSISDN) 680

Partial MSISDN, MNO OTP URL  682

OTP 684

[Obtain Auto-Fill Consent 686]

OTP 688

OTP 690

OTP 692

OTP Result (Success, Failure, Retry)  694

Trigger ESIM Profile Download 696

Source Wireless Device And Target Wireless Device From Same Or From Different OEMs

FIG. 6D

MNO ENTITLEMENT SERVER DECISION TREE

800

OEM ACTIVATION SERVER DECISION TREE

850

Activation Request
852

MNO Account Owner
or Member?
854

MNO Account
Owner

Execute FIG. 5B
Procedure
858

MNO Account
Member

MNO Account Owner
Wireless Device Reachable
Via OEM Cloud Network
Service and OEM Push
Network Service?
856

Yes

Execute FIGS. 6C, 6D
Procedure
860

No

Execute FIG. 7
Procedure
862

900

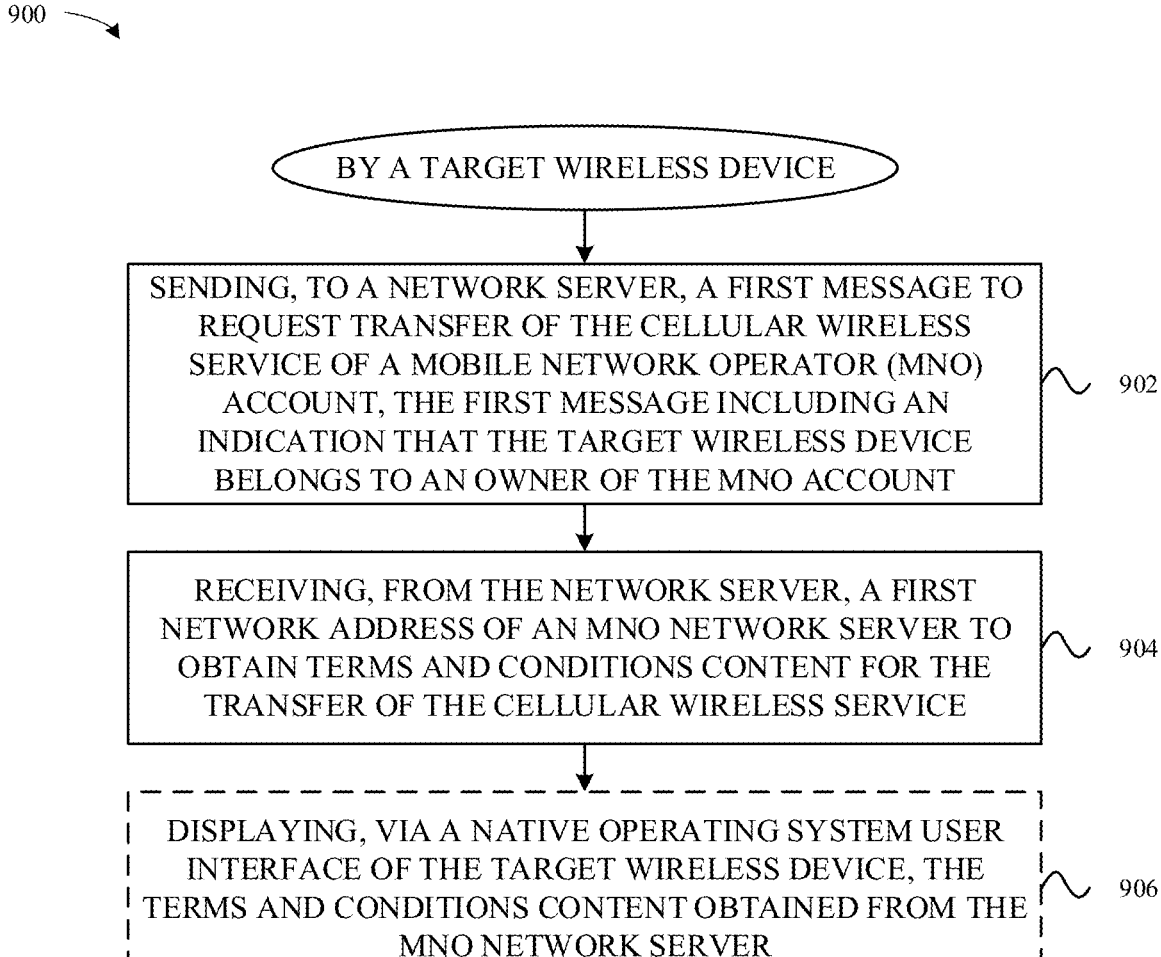

SENDING, TO A NETWORK SERVER, A FIRST MESSAGE TO REQUEST TRANSFER OF THE CELLULAR WIRELESS SERVICE OF A MOBILE NETWORK OPERATOR (MNO) ACCOUNT, THE FIRST MESSAGE INCLUDING AN INDICATION THAT THE TARGET WIRELESS DEVICE BELONGS TO AN OWNER OF THE MNO ACCOUNT — 902

RECEIVING, FROM THE NETWORK SERVER, A FIRST NETWORK ADDRESS OF AN MNO NETWORK SERVER TO OBTAIN TERMS AND CONDITIONS CONTENT FOR THE TRANSFER OF THE CELLULAR WIRELESS SERVICE — 904

DISPLAYING, VIA A NATIVE OPERATING SYSTEM USER INTERFACE OF THE TARGET WIRELESS DEVICE, THE TERMS AND CONDITIONS CONTENT OBTAINED FROM THE MNO NETWORK SERVER — 906

RESPONSIVE TO RECEIPT OF AN INDICATION OF CONSENT TO THE TERMS AND CONDITIONS CONTENT BY THE OWNER OF THE MNO ACCOUNT, SENDING THE INDICATION OF CONSENT TO AN MNO BACKEND SYSTEM — 908

*FIG. 9A*

920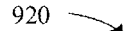

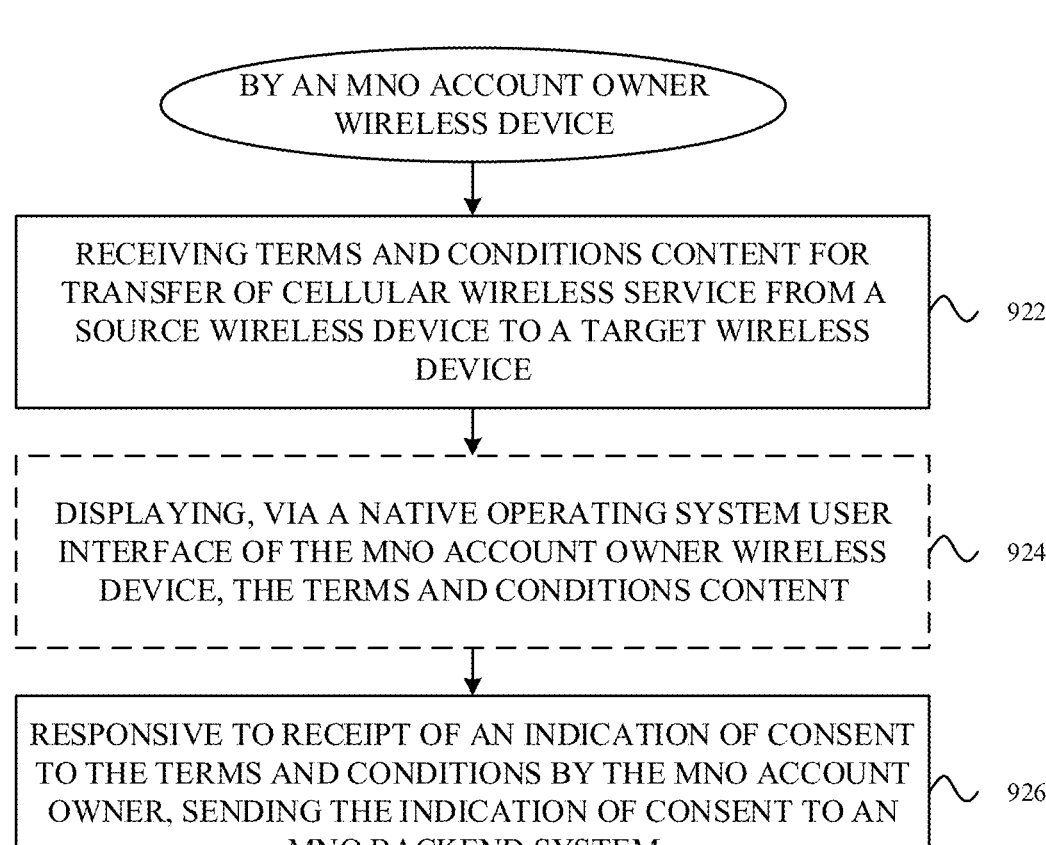

BY AN MNO ACCOUNT OWNER WIRELESS DEVICE

RECEIVING TERMS AND CONDITIONS CONTENT FOR TRANSFER OF CELLULAR WIRELESS SERVICE FROM A SOURCE WIRELESS DEVICE TO A TARGET WIRELESS DEVICE ⟶ 922

DISPLAYING, VIA A NATIVE OPERATING SYSTEM USER INTERFACE OF THE MNO ACCOUNT OWNER WIRELESS DEVICE, THE TERMS AND CONDITIONS CONTENT ⟶ 924

RESPONSIVE TO RECEIPT OF AN INDICATION OF CONSENT TO THE TERMS AND CONDITIONS BY THE MNO ACCOUNT OWNER, SENDING THE INDICATION OF CONSENT TO AN MNO BACKEND SYSTEM ⟶ 926

BY A MOBILE NETWORK OPERATOR
(MNO) ENTITLEMENT SERVER

RECEIVING, FROM A TARGET WIRELESS DEVICE, A FIRST
MESSAGE TO TRANSFER CELLULAR WIRELESS SERVICE
OF AN MNO ACCOUNT, THE FIRST MESSAGE INCLUDING
AN INDICATION THAT THE TARGET WIRELESS DEVICE
BELONGS TO AN OWNER OF THE MNO ACCOUNT OR TO A
MEMBER OF THE MNO ACCOUNT OTHER THAN THE
OWNER OF THE MNO ACCOUNT

942

SENDING, TO THE TARGET WIRELESS DEVICE, A FIRST
NETWORK ADDRESS OF AN MNO SERVER FROM WHICH TO
OBTAIN TERMS AND CONDITIONS CONTENT FOR THE
TRANSFER OF THE CELLULAR WIRELESS SERVICE

944

RECEIVING, FROM THE TARGET WIRELESS DEVICE, A
SECOND MESSAGE TO OBTAIN A ONE-TIME PASSCODE FOR
ADDITIONAL AUTHENTICATION FOR TRANSFER OF THE
CELLULAR WIRELESS SERVICE

946

SENDING, TO THE TARGET WIRELESS DEVICE, A SECOND
NETWORK ADDRESS FOR A SECOND MNO SERVER TO
WHICH THE ONE-TIME PASSCODE IS TO BE SENT TO
CONFIRM THE ADDITIONAL AUTHENTICATION FOR
TRANSFER OF THE CELLULAR WIRELESS SERVICE

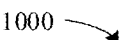
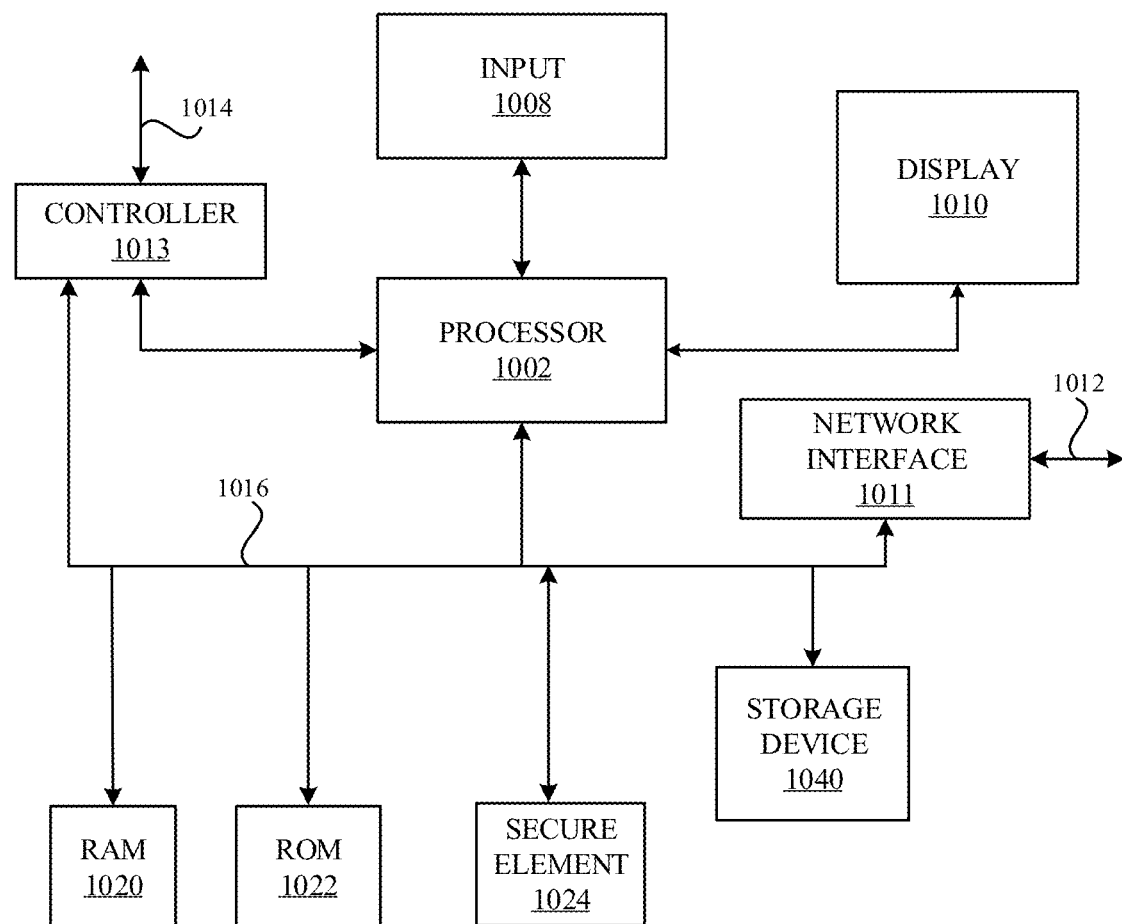
*FIG. 10*

MULTI-FACTOR AUTHENTICATION BASED CELLULAR WIRELESS SERVICE TRANSFER WITH ACCOUNT OWNER CONSENT

FIELD

The described embodiments set forth techniques for transferring cellular wireless service from a source wireless device to a target wireless device with multi-factor authentication and consent by a mobile network operator (MNO) account owner. Terms and conditions for transfer of the cellular wireless service are presented via a native operating system user interface of a wireless device of the MNO account owner, and a multi-factor authentication one-time passcode is automatically entered for verification without requiring manual entry.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a non-volatile memory, where the non-volatile memory is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

Mechanisms to transfer a cellular wireless service plan between wireless devices include i) physical transfer of a UICC (SIM card) from a source device to a target device and ii) and electronic transfer of a SIM of a UICC or an eSIM of an eUICC of a source wireless device to an eSIM on an eUICC of a target wireless device. In some cases, a new eSIM is downloaded, installed, and enabled on the eUICC of the target wireless device, while an old eSIM is disabled and/or removed from the eUICC of the source wireless device. Present authentication procedures ensure that transfer of the cellular wireless service is under control of a legitimate user of the source wireless device and of a legitimate user of the target wireless device. The cellular wireless service plan being transferred, however, may belong to an MNO account having a primary owner, with authority to manage the MNO account, and one or more secondary members that share the MNO account under management of the primary owner. There exists a need for mechanisms to provide secure and convenient authentication for cellular wireless transfer by an MNO account owner.

SUMMARY

This Application sets forth techniques for transferring cellular wireless service from a source wireless device to a target wireless device with multi-factor authentication and consent by an owner of a mobile network operator (MNO) account that includes MNO account members. In some embodiments, the MNO account is a multi-user account, such as a family account, that includes an MNO account owner, authorized for managing the MNO account, and one or more MNO account members that share access to cellular wireless service via the MNO account. The MNO account owner and the one or more MNO account members can each possess distinct wireless devices that have their own profiles, e.g., subscriber identity modules (SIMs) and/or electronic SIMs (eSIMs), for access to cellular wireless service. Terms and conditions for transfer of the cellular wireless service are presented via a native operating system user interface of a wireless device of the MNO account owner. In some cases, the MNO account owner wireless device is the target wireless device receiving the cellular wireless service transfer, while in other cases the MNO account owner wireless device facilitates transfer of the cellular wireless service (by having the MNO account owner review terms and conditions and provide one-time passcode authentication) to a target wireless device of an MNO account member. In some embodiments, the target wireless device sends a message to an MNO entitlement server requesting transfer of cellular wireless service. In some embodiments, the target wireless device sends a message to an original equipment manufacturer (OEM) activation server requesting activation of an eSIM reserved for the target wireless device and associated with transfer of cellular wireless service to the target wireless device. The OEM activation server and/or one or more MNO servers, e.g., the MNO entitlement server and/or MNO backend systems, can communicate with a wireless device of the MNO account owner to present terms and conditions and complete multi-factor authentication with a one-time passcode to authorize transfer of the cellular wireless service. When the target wireless device belongs to an MNO account member other than the MNO account owner, terms and conditions for transfer of the cellular wireless service can be relayed to the MNO account owner's device via a cloud network service or directly sent to the MNO account owner's device via an OEM push notification service. In some embodiments, terms and conditions information can be communicated between wireless devices via a peer-to-peer connection between them, e.g., from a target wireless device to an MNO account owner wireless device.

In some embodiments, an MNO uses a one-time passcode (or requires entry of a personal identification number, PIN, value) to further confirm authorization to transfer the cellular wireless service. In some embodiments, the one-time passcode is automatically entered, at the source wireless device or at the MNO account owner wireless device, for verification and forwarded without requiring manual entry of the one-time passcode at the target wireless device. In some cases, the one-time passcode is forwarded via a cloud network service with which the MNO account owner's wireless device and the target wireless device are each registered, e.g., with a common cloud network service account or with a related set of cloud network service accounts, such as with a family sharing arrangement. In some embodiments, the MNO account owner provides consent to share the one-time passcode with the target wireless device. In some embodiments, consent to the terms and conditions for the wireless transfer also includes consent to share the one-time passcode.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 2 illustrates a block diagram of a more detailed view of exemplary components of the system of FIG. 1, according to some embodiments.

FIGS. 3A and 3B illustrate block diagrams of exemplary cellular service transfer mechanisms for wireless devices, according to some embodiments.

FIG. 4A illustrates an exemplary sequence of actions to transfer cellular wireless service associated with a subscriber identity module (SIM) or electronic SIM (eSIM) of a source wireless device to a target wireless device, according to some embodiments.

FIGS. 6C and 6D illustrate an exemplary sequence of actions to activate an eSIM on a target wireless device belonging to an MNO account member as part of transfer of cellular wireless service from a source wireless device to the target wireless device, according to some embodiments.

FIG. 9A illustrates a flowchart of an exemplary method performed by a target wireless device to transfer cellular wireless service from a source wireless device to the target wireless device with MNO account owner consent, according to some embodiments.

FIG. 9B illustrates a flowchart of an exemplary method performed by an MNO account owner wireless device to transfer cellular wireless service from a source wireless device to a target wireless device with MNO account owner consent, according to some embodiments.

FIG. 9C illustrates a flowchart of an exemplary method performed by an MNO entitlement server to transfer cellular wireless service from a source wireless device to a target wireless device with MNO account owner consent, according to some embodiments.

FIG. 10 illustrates a block diagram of exemplary elements of a mobile wireless device, according to some embodiments.

DETAILED DESCRIPTION

Figure 1:
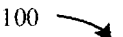
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This Application sets forth techniques for transferring cellular wireless service from a source wireless device to a target wireless device with multi-factor authentication and consent by an owner of a mobile network operator (MNO) account. The MNO account can provide for managing cellular wireless service for multiple wireless devices, including a wireless device belonging to the MNO account owner and one or more wireless devices belonging to MNO account members other than the MNO account owner. The MNO account can be a multi-user account, such as a family account, that includes the MNO account owner, authorized for managing the MNO account, and MNO account members that share access to cellular wireless service via the MNO account. The MNO account owner and the one or more MNO account members can each possess distinct wireless devices that have their own profiles, e.g., subscriber identity modules (SIMs) and/or electronic SIMs (eSIMs), for access to cellular wireless service.

The MNO account owner or an MNO account member can seek to transfer cellular wireless service to a wireless device associated with the MNO account, e.g., when replacing an old wireless device with a new wireless device, or when adding a wireless device to the MNO account. Transfer of cellular wireless service to a target wireless device of the MNO account from a source wireless device, which may or may not be part of the MNO account, can require confirmation of authorization by the MNO account owner. Present techniques to authenticate a user of the source wireless device, e.g., using an extensible authentication protocol (EAP) authentication and key agreement (AKA) procedure via a cellular wireless network, and to authenticate a user of the target wireless device, e.g., using an MNO specific verification procedure, such as a login identifier, password, and personal identification number (PIN) value via a web-sheet server, does not guarantee that the MNO account owner consents to terms and conditions for transfer of the cellular wireless service. For example, a parent can seek to control transfer and consent to terms and conditions for cellular wireless service for their children's wireless devices.

In the embodiments described herein, terms and conditions for transfer of the cellular wireless service are presented via a native operating system user interface of a wireless device of the MNO account owner. In some cases, the MNO account owner wireless device is the target wireless device receiving the cellular wireless service transfer, while in other cases the MNO account owner wireless device facilitates transfer of the cellular wireless service (by reviewing terms and conditions and providing one-time passcode authentication) to a target wireless device belonging to an MNO account member that shares the MNO account with the MNO account owner. In some embodiments, the target wireless device sends a transfer request message to an MNO entitlement server requesting transfer of the cellular wireless service. In some embodiments, the transfer request message can include a transfer token obtained by the target wireless device from a source wireless device from which cellular wireless service is to be transferred. In some embodiments, the transfer request message can include an indication whether the target wireless device belongs to the MNO account owner or to an MNO account member, i.e., other than the MNO account owner. When the target wireless device belongs to the MNO account owner, the MNO entitlement server can provide terms and conditions information, e.g., a network address from which to obtain the terms and conditions for transfer of the cellular wireless service to the target wireless device, and the MNO account owner can provide consent to transfer of the cellular wireless service via the target wireless device to an MNO backend system. In some embodiments, an MNO uses a one-time passcode (or requires entry of a personal identification number, PIN, value) to further confirm authorization to transfer the cellular wireless service. In some embodiments, the MNO backend system provides a one-time passcode to the source wireless device, which can forward the one-time passcode via a cloud network service with which both the source wireless device and the target wireless device can be registered, e.g., using a common cloud network service account or using a set of associated cloud network service accounts, such as via a family account.

When the target wireless device belongs to an MNO account member, the target wireless device can forward terms and conditions information received from the MNO entitlement server to the MNO account owner wireless device via a cloud network service with which both the MNO account owner device and the target wireless device can be registered, e.g., using a common cloud network service account or using a set of associated cloud network service accounts, such as via a family sharing arrangement. In some embodiments, terms and conditions information can be communicated between wireless devices via a peer-to-peer connection between them, e.g., from the target wireless device to the MNO account owner wireless device. Terms and conditions information can be presented via the native operating system user interface of the MNO account owner wireless device, which can forward consent for transfer of the cellular wireless service back to the target wireless device via the cloud network service. The target wireless device can then forward the MNO account owner's consent to an MNO backend system. In some embodiments, the MNO backend system provides a one-time passcode to the MNO account owner's wireless device, which can forward the one-time passcode via the cloud network service to the target wireless device to provide to the carrier backend system further indication authorization by the MNO account owner to transfer the cellular wireless service to the target wireless device.

In some embodiments, the target wireless device sends an activation request message to an original equipment manufacturer (OEM) activation server requesting activation of an eSIM reserved for the target wireless device and associated with transfer of cellular wireless service to the target wireless device from a source wireless device. In some embodiments, the activation request message can include an indication whether the target wireless device belongs to the MNO account owner or to an MNO account member, i.e., other than the MNO account owner. When the target wireless device belongs to the MNO account owner, the OEM activation server can provide terms and conditions information, e.g., a network address from which to obtain the terms and conditions for transfer of the cellular wireless service to the target wireless device, and the MNO account owner can provide consent to transfer of the cellular wireless service via the target wireless device to an MNO backend system. In some embodiments, an MNO uses a one-time passcode (or requires entry of a personal identification number, PIN, value) to further confirm authorization to transfer the cellular wireless service. In some embodiments, the MNO backend system provides a one-time passcode to the source wireless device, which can forward the one-time passcode via a cloud network service with which both the source wireless device and the target wireless device can be registered, e.g., using a common cloud network service account or using a set of associated cloud network service accounts, such as via a family sharing arrangement.

When the target wireless device belongs to an MNO account member, the OEM activation server can provide terms and condition information to an MNO account owner device (rather than to the target wireless device) via an OEM push notification message service. The MNO account owner can review the terms and conditions for transfer of the cellular wireless service to the target wireless device, presented via an native operating system user interface of the MNO account owner device, and provide consent for transfer of the cellular wireless service to an MNO backend system. In some embodiments, the MNO backend system provides a one-time passcode to the MNO account owner's wireless device, which can forward the one-time passcode via the cloud network service to the target wireless device to provide to the carrier backend system further indication authorization by the MNO account owner to transfer the cellular wireless service to the target wireless device.

In some embodiments, the one-time passcode is automatically entered, at a source wireless device or at the MNO account owner's wireless device, for verification and forwarded to the target wireless device, without requiring manual entry of the one-time passcode at the target wireless device. In some embodiments, the MNO account owner provides consent to share the one-time passcode with the target wireless device. In some embodiments, consent to the terms and conditions for the cellular wireless service transfer to the target wireless device also includes consent to share the one-time passcode with the target wireless device.

These and other embodiments are discussed below with reference to FIGS. 1-10; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a wireless device 102, which can also be referred to as a device, a wireless device, a mobile device, a user equipment (UE) and the like, a group of base stations 112-1 to 112-N that are managed by different Mobile Network Operators (MNOs) 114, and a set of MNO provisioning servers 116 that are in communication with the MNOs 114. Additional MNO infrastructure servers, such as used for account management and billing are not shown. The wireless device 102 can represent a mobile computing device (e.g., an iPhone®, an iPad®, or an Apple Watch by Apple®), the base stations 112-1 to 112-*n* can represent cellular wireless network entities including evolved NodeBs (eNodeBs or eNBs) and/or next generation NodeBs (gNodeBs or gNB) that are configured to communicate with the wireless device 102, and the MNOs 114 can represent different wireless service providers that provide specific cellular wireless services (e.g., voice and data) to which the wireless device 102 can subscribe, such as via an MNO subscription account for a user of the wireless device 102. The MNO subscription account can be managed by an MNO account owner, e.g., via a wireless device 102 belonging to the MNO account owner. In some cases, the MNO subscription account can include one or more additional MNO account members that can access cellular wireless service of the MNO via their own associated wireless devices 102, such as with a shared family account.

As shown in FIG. 1, the wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the wireless device 102 includes one or more physical UICCs 118, also referred to as Subscriber Identity Module (SIM) cards, in addition to the eUICC 108. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the wireless device 102 is associated. To be able to access services provided by an MNO, an eSIM can downloaded to and installed on the eUICC 108. In some embodiments, the eUICC 108 obtains one or more eSIMs from one or more associated MNO provisioning servers 116. The MNO provisioning servers 116 can be maintained by the MNOs 114, an OEM manufacturer, third party entities, and the like. Communication of eSIM data between an MNO provisioning server 116 and the eUICC 108 (or between the MNO provisioning server 116 and processing circuitry of the wireless device 102 external to the eUICC 108, e.g., the processor 104) can use a secure communication channel.

FIG. 2 illustrates a block diagram of a more detailed view 200 of particular components of the wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and to provide baseband wireless circuitry 110 with access to the eSIMs 208 to provide access to wireless services for the wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the wireless device 102 to communicate with an MNO 114 and provide useful features (e.g., phone calls and internet access) to a user of the wireless device 102.

As also shown in FIG. 2, the baseband wireless circuitry 110 of the wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the wireless device 102 and MNOs 114 according to the different eSIMs 208 that are enabled within the eUICC 108.

FIG. 3A illustrates diagrams 300, 320 of two exemplary mechanisms to transfer a cellular wireless service plan from a source wireless device 102A to a target wireless device 102B. In diagram 300, a cellular wireless service plan is associated with a UICC (SIM card) 118 that includes credentials for access to wireless networks of an MNO 114. When the target wireless device 102B supports hardware and software capabilities required to access wireless networks of an MNO 114 using a SIM in the UICC 118, a user can remove the UICC 118 from the source wireless device 102A and insert the UICC 118 into a receiving bay of the target wireless device 102B. The target wireless device 102B can use credentials included in the SIM of the UICC 118 to authenticate with and camp on a cellular wireless access network associated with the MNO 114 associated with the SIM of the UICC 118. The source wireless device 102A and the target wireless device 102B can belong to distinct users and can be supplied by different original equipment manufacturers (OEMs). Applets 212 associated with the SIM of the UICC 118 also can be stored on the UICC 118 and transfer with the SIM from the source wireless device 102A to the target wireless device 102B.

Diagram 320 illustrates an exemplary mechanism to transfer a cellular wireless service plan, associated with an eSIM 208 on an eUICC 108, from a source wireless device 102A to a target wireless device 102B using a cloud network service 302. Unlike the mechanism illustrated in diagram 300, physical transfer of a UICC 118 does not occur, and in some cases a new eSIM 208 can be provided to an eUICC 108 of the target wireless device 102B as part of the transfer. If a new eSIM 208 is downloaded from an MNO provisioning server 116, then files for installation of applets 212 can also be provided by the MNO provisioning server 116 in a bound profile package (BPP) that includes the new eSIM 208. In some cases, each of the source wireless device 102A and the target wireless device 102B can be registered with a common cloud network service account, such as managed by a cloud network service, e.g., an iCloud® service account, or registered with related cloud network service accounts, such as via a family sharing arrangement. The source wireless device 102A can provide information regarding cellular wireless service plans available on the source wireless device 102A to the cloud network service 302, and the target wireless device 102B can discover available cellular wireless service plans based on the information stored at the cloud network service 302. In some cases, the source wireless device 102A can obtain from the MNO entitlement server 304 a transfer token to use for transfer of a cellular wireless service plan associated with an eSIM 208 of the source wireless device to an eSIM 208 on the target wireless device 102B. In some cases, the target wireless device 102B can obtain an eSIM 208 from the MNO provisioning server 116, which can be authorized to release the eSIM 208 to the target wireless device 102B based on communication from the MNO entitlement server 304. The target wireless device 102B can download, install, and activate the eSIM 208 on an eUICC 108 of the target wireless device 102B. The transfer mechanism illustrated by the diagram 320 requires, however, that the source wireless device 102A and the target wireless device 102B be linked by a common user account at the cloud network service 302 and that a new eSIM 208 be downloaded from the MNO provisioning server 116.

FIG. 3B illustrates diagrams 340, 360 of additional exemplary mechanisms to transfer a cellular wireless service plan associated with a SIM or eSIM 208 of a source wireless device 102A to an eSIM 208 of a target wireless device

102B, where the source and target wireless devices 102A, 102B are not required to be linked to a common user account of a cloud network-based service or to be manufactured by a common OEM. As illustrated by diagram 340, the source wireless device 102A and the target wireless device 102B can establish a secure local connection 342 between them over which to exchange information required to select and transfer a cellular wireless service plan, associated with a SIM on a UICC 118 or an eSIM 208 on an eUICC 108 of the source wireless device 102A, to a new eSIM 208 downloaded to an eUICC 108 of the target wireless device 102B. In some embodiments, as illustrated in diagram 360, the source wireless device 102A can provide information for transfer of the cellular wireless service plan to the target wireless device 102B using a quick response (QR) code, which can be scanned by the target wireless device 102B. In some embodiments, the source and target wireless devices 102A, 102B are within proximity of each other to allow display of the QR code on the source wireless device 102A and scanning by a camera of the target wireless device 102B. In some embodiments, the source and target wireless devices 102A, 102B are not within proximity of each other, and the source wireless device 102A provides the QR code to the target wireless device 102B via an alternative out-of-band communication channel (not shown), such as via email or via a message service. In either mechanism (secure Bluetooth or QR code), each of the source wireless device 102A and the target wireless device 102B can communicate with an MNO entitlement server 304 to authorize transfer of the cellular wireless service plan from the source wireless device 102A to the target wireless device 102B. The MNO entitlement server 304 can communicate information to the MNO provisioning server 116 to reserve a new eSIM 208 for the transferred cellular wireless service plan. The target wireless device 102B can download the new eSIM 208 from the MNO provisioning server 116 and subsequently install and activate the new eSIM 208 on an eUICC 108 of the target wireless device 102B. In some embodiments, the source and target wireless devices 102A, 102B need to be within a threshold proximity distance of each other in order to establish the secure Bluetooth communication channel. In some embodiments, the source wireless device 102A and the target wireless device 102B can use different operating systems and can be manufactured by different OEMs, e.g., an iOS device manufactured by Apple Inc. and an Android™ device manufactured by Motorola.

FIG. 4A illustrates a diagram 400 of an exemplary sequence of actions performed to transfer cellular wireless service of an eSIM 208 of a source wireless device 102A to a target wireless device 102B. At 404, the source wireless device 102A obtains a transfer token from an MNO entitlement server 304 to transfer a cellular wireless service plan associated with a SIM or eSIM 208 of the source wireless device 102A. In some cases, the source wireless device 102A can authenticate using an extensible authentication protocol (EAP) authentication and key agreement (AKA) procedure. In some cases, the source wireless device 102A executes a secure intent procedure via a native operating system to further confirm the transfer. The source wireless device 102A can provide the transfer token, at 406, to the target wireless device 102B to use for proving (at least in part) authority for transfer of the cellular wireless service from the source wireless device 102A to the target wireless device 102B. At 408, the target wireless device 102B sends to the MNO entitlement server 304 a transfer request message that includes the transfer token obtained from the source wireless device 102A. The MNO 114 that provides the cellular wireless service to be transferred can require verification of an authorized user of the MNO account with which the cellular wireless service is associated, such as via a web-sheet server using an MNO-specific web-view overlay, which can differ for each MNO and therefore may provide a non-user-friendly user experience. At 410, the MNO entitlement server 304 can provide a network address, e.g., a universal resource locator (URL) value, for an MNO backend system 402 with communicate to verify authority for transfer of the cellular wireless service. At 418, the MNO backend system 402 can communicate with the target wireless device 102B, using a web-view overlay, to present terms and conditions for transfer of the cellular wireless service, to obtain consent to the transfer of the cellular wireless service and associated terms and conditions, and/or to verify a user, e.g., with a login identifier, password, and/or personal identification number (PIN) value. At 420, the target wireless device 102B can provide user consent to the terms and conditions for transfer of the cellular wireless service to the target wireless device 102B. At 422, the target wireless device 102B and MNO entitlement server 304 can trigger transfer of the cellular wireless service of the eSIM 208 of the source wireless device 102A to the target wireless device 102B, e.g., by downloading, installing, and activating a new eSIM 208 associated with the cellular wireless service on the target wireless device 102B. The procedure illustrated in FIG. 4A ensures that the source wireless device 102A and the target wireless device 102B are under control of a legitimate user; however, an MNO account owner may seek to control transfer of the cellular wireless service for an MNO account member associated with the target wireless device 102B or with the source wireless device 102A. Present mechanisms do not provide for presenting terms and conditions and obtaining consent of the MNO account owner.

Figure 4B:
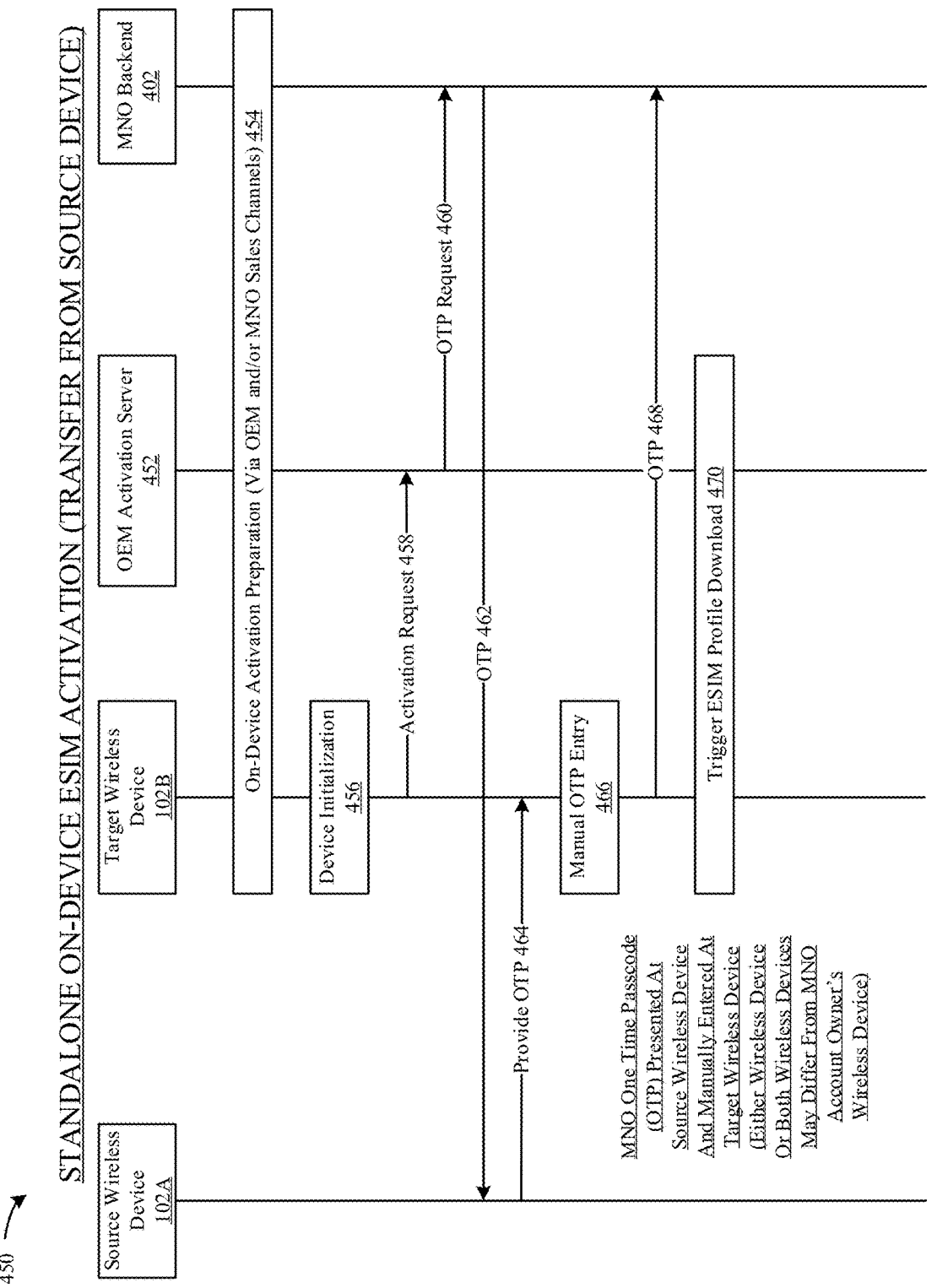
FIG. 4B illustrates an exemplary sequence of actions to activate an eSIM on a target wireless device as part of transfer of cellular wireless service from a source wireless device to the target wireless device, according to some embodiments.

FIG. 4B illustrates a diagram 450 of an exemplary sequence of actions performed to activate an eSIM 208 on a target wireless device 102B in associated with transfer of cellular wireless service from a SIM or eSIM 208 of a source wireless device 102A. At 454, a procedure for preparation of on-device activation of an eSIM 208 for the target wireless device 102B is performed by an OEM activation server 452 and an MNO backend system 402. This preparation procedure can be initiated via an OEM sales channel and/or via an MNO sales channel associated with purchase of the target wireless device 102B. At 456, an initialization procedure for the target wireless device 102B is performed, e.g., when unboxing and powering on the target wireless device 102B. At 458, the target wireless device 102B sends a message to an OEM activation server 452 to request activation of an eSIM 208 reserved for the target wireless device 102B, e.g., as part of the on-device activation procedure previously performed. At 460, the OEM activation server 452 can send a message to the MNO backend system for a one-time passcode (OTP) to be sent for confirmation of transfer of cellular wireless service from the source wireless device 102A. At 462, the MNO backend system 402 sends the OTP to the source wireless device 102A, which provides the OTP to the target wireless device 102B at 464. At 466, a user of the target wireless device 102B can be required to manually enter the OTP, which is sent to the MNO backend system 402 at 468 for confirmation of authority to transfer the cellular wireless service to the target wireless device 102B. After successfully providing the OTP, at 470, the target wireless device 102B and the OEM activation server can initiate provisioning of an eSIM 208 to the target wireless device. The procedure illustrated in FIG. 4B ensures that the source wireless device 102A and the target wireless device 102B are under control of a legitimate user; however, as with FIG. 4B, an MNO account owner may seek to control transfer of the cellular wireless service for an MNO account member associated with the target wireless device 102B or with the source wireless device 102A. Present mechanisms do not provide for presenting terms and conditions and obtaining consent of the MNO account owner.

Figure 5A:
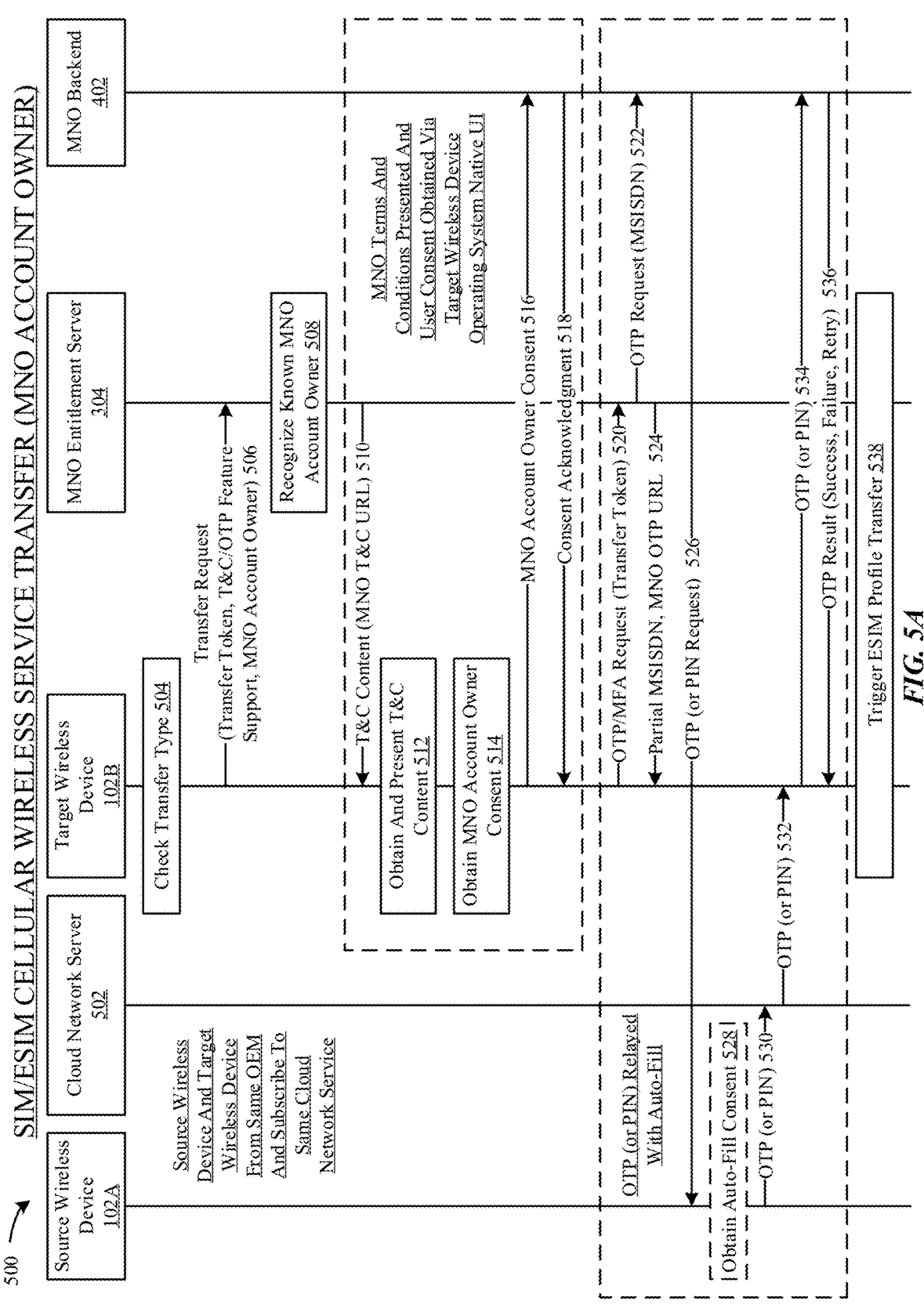
FIG. 5A illustrates an exemplary sequence of actions to transfer cellular wireless service from a source wireless device to a target wireless device belonging to a mobile network operator (MNO) account owner, according to some embodiments.

FIG. 5A illustrates a diagram 500 of an exemplary sequence of actions to transfer cellular wireless service of a SIM or eSIM 208 of a source wireless device 102A to a target wireless device 102B with consent of an MNO account owner. In the example of FIG. 5A: i) the target wireless device 102B belongs to the MNO account owner, ii) each of the source wireless device 102A and the target wireless device 102B are manufactured by the same OEM, and iii) the source wireless device 102A and the target wireless device 102B both subscribe to the same cloud network service, e.g., to a common cloud service account or to a set of related cloud service accounts, such as via a family sharing arrangement. At 504, the target wireless device 102B determines a type of cellular wireless service transfer to be performed, e.g., based on a previously obtained transfer token or by an on-device activation procedure, by an MNO account owner or an MNO account member to which the target wireless device 102B belongs. At 506, the target wireless device 102B sends to the MNO entitlement server 304 a transfer request message, which can include: i) a transfer token obtained from the source wireless device 102A, ii) an indication of support for a feature regarding handling and/or displaying terms and conditions information and/or OTPs, and iii) an indication that the target wireless device 102B belongs to an MNO account owner associated with an MNO account for which cellular wireless service is being transferred to the target wireless device 102B. At 508, the MNO entitlement server 304 can recognize that the transfer request message is from a known MNO account owner to which terms and conditions information can be presented. At 510, the MNO entitlement server 304 provides terms and conditions information, e.g., a network address (URL value) for an MNO server from which the target wireless device 102B can obtain the terms and conditions for transfer of the cellular wireless service. At 512, the target wireless device 102B obtains and presents the terms and conditions content via a native operating system user interface (UI) of the target wireless device 102B. This feature allows for presenting the terms and conditions information of different MNOs in a consistent manner at the target wireless device 102B. At 514, the target wireless device 102B obtains consent of the target wireless device 102B user, which is also the MNO account owner, as indicated previously at 506 and recognized at 508. At 516, the target wireless device 102B sends to an MNO backend system 402 an indication of consent (agreement) of the MNO account owner for transfer of the cellular wireless service to the target wireless device 102B. At 518, the MNO backend system 402 provides to the target wireless device 102B a message indicating acknowledgment of receipt of the MNO account owner consent.

In some embodiments, the MNO 114 requires an additional multi-factor authentication (MFA) via an OTP or a PIN code. The OTP (or PIN code) can be relayed to the target wireless device 102B via the source wireless device 102A when both subscribe to a cloud network service and are known to be related to each other. For example family members of a common cloud network service account or set of related cloud network service accounts, such as via a family sharing arrangement. At 520, the target wireless device 102B sends a message to the MNO entitlement server 304 requesting transmission of the OTP (or PIN code). In some embodiments, the message includes the transfer token to indicate authority to request the OTP (or PIN code). At 522, the MNO entitlement server 304 sends to the MNO backend system 402 a request for the OTP (or PIN code), the request including a mobile station international subscriber directory number (MSISDN) value for the cellular wireless service that is associated with the eSIM 208 of the source wireless device 102A and is being transferred to the target wireless device 102B. The MNO backend system 402, at 526, sends the OTP (or PIN code request) to the source wireless device 102A. In some embodiments, at 528, the OTP is automatically filled (or made available for a one-click consent to fill) and returned at 530 to a cloud network server 502 of a cloud network service to which both the source wireless device 102A and the target wireless device 102B subscribe (e.g., via a common cloud network service account or via related cloud network service accounts, such as via a family sharing arrangement). In some embodiments, a user of the source wireless device 102A enters a PIN code that is forwarded to the cloud network server 502. The cloud network server 502, at 532, forwards the OTP (or PIN code) to the target wireless device 102B, which can forward the OTP (or PIN code) at 534 to the MNO backend system 402 to confirm transfer of the cellular wireless service from the source wireless device 102A to the target wireless device 102B. At 536, the MNO backend system 402 returns to the target wireless device 102B a result (e.g., success, failure, or retry) responsive to receipt of the OTP (or PIN code) from the target wireless device 102B. After successful authorization of the cellular wireless transfer, the target wireless device 102B with the MNO entitlement server 304, at 538, can trigger transfer of the cellular wireless service eSIM profile (which can include in some cases downloading a new eSIM profile) to the target wireless device 102B.

Figure 5B:
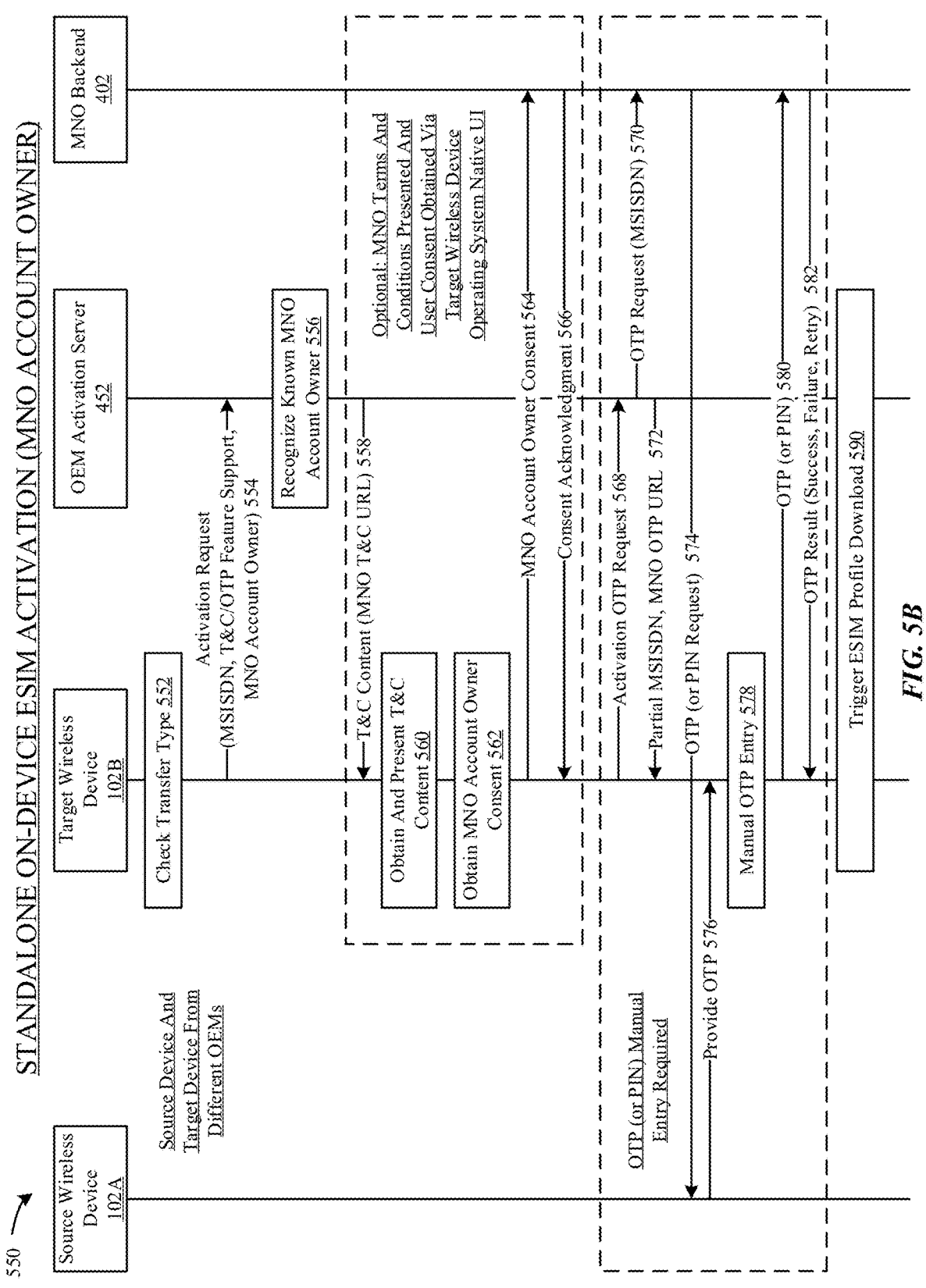
FIG. 5B illustrates an exemplary sequence of actions to activate an eSIM on a target wireless device belonging to an MNO account owner as part of transfer of cellular wireless service from a source wireless device to the target wireless device, according to some embodiments.

FIG. 5B illustrates a diagram 550 of an exemplary sequence of actions to activate an eSIM 208 on a target wireless device 102B belonging to an MNO account owner as part of transfer of cellular wireless service from a source wireless device 102A to the target wireless device 102B with consent of the MNO account owner. In the example of FIG. 5B: i) the target wireless device 102B belongs to the MNO account owner, and ii) the source wireless device 102A and the target wireless device 102B are manufactured by different OEMs. At 552, the target wireless device 102B determines a type of cellular wireless service transfer to be performed, e.g., the transfer is based on a reservation of a new eSIM 208 for the target wireless device 102B that will take over a cellular wireless service subscription from a SIM or eSIM 208 of the source wireless device 102A. At 554, the target wireless device 102B sends to an OEM activation server 452 an activation request message, which can include: i) an MSISDN value the cellular wireless service that is associated with the eSIM 208 of the source wireless device 102A and is being transferred to the target wireless device 102B, ii) an indication of support for a feature regarding handling and/or displaying terms and conditions information and/or OTPs, and iii) an indication that the target wireless device 102B belongs to an MNO account owner associated with an MNO account for which cellular wireless service is being transferred to the target wireless device 102B. At 556, the OEM activation server 452 can recognize that the activation request message is from a known MNO account owner to which terms and conditions information can be presented. In some embodiments, terms and conditions for transfer of the cellular wireless service to the target wireless device 102B can be presented and consent obtained from a user of the target wireless device 102B via a native operating system UI of the target wireless device 102B. At 558, the OEM activation server 452 provides terms and conditions information, e.g., a network address (URL value) for an MNO server from which the target wireless device 102B can obtain the terms and conditions for transfer of the cellular wireless service. At 560, the target wireless device 102B obtains and presents the terms and conditions content via the native operating system UI of the target wireless device 102B. This feature allows for presenting the terms and conditions information of different MNOs in a consistent manner at the target wireless device 102B. At 562, the target wireless device 102B obtains consent of the target wireless device 102B user, which is also the MNO account owner, as indicated previously at 554 and recognized at 556. At 564, the target wireless device 102B sends to an MNO backend system 402 an indication of consent (agreement) of the MNO account owner for transfer of the cellular wireless service to the target wireless device 102B. At 566, the MNO backend system 402 provides to the target wireless device 102B a message indicating acknowledgment of receipt of the MNO account owner consent.

In some embodiments, the MNO 114 requires an additional multi-factor authentication (MFA) via an OTP or a PIN code. At 568, the target wireless device 102B sends a message to the OEM activation server 452 requesting transmission of the OTP or PIN code to continue the procedure for activation of the eSIM 208. At 570, the OEM activation server 452 sends to the MNO backend system 402 a request for the OTP (or PIN code), the request including the MSISDN value for the cellular wireless service that is associated with the eSIM 208 of the source wireless device 102A and is being transferred to the target wireless device 102B. The MNO backend system 402, at 574, sends the OTP (or PIN code request) to the source wireless device 102A. As the source wireless device 102A and the target wireless device 102B are manufactured by different OEMs there may not be a common cloud service account by which to forward to the OTP (or PIN) from the source wireless device 102A to the target wireless device 102B. The source wireless device 102A, at 576, provides the OTP (or PIN) to the target wireless device 102B by an out-of-band communication channel, e.g., via a telephone call, a message service, a visual presentation at the source wireless device 102A to allow for a user of the target wireless device 102B to read and copy. At 578, the OTP (or PIN) is manually entered to the target wireless device 102B and forwarded to the MNO backend system 402 at 580 to confirm authentication of the target wireless device 102B for transfer of the cellular wireless service from the source wireless device 102A. At 582, the MNO backend system 402 returns to the target wireless device 102B a result (e.g., success, failure, or retry) responsive to receipt of the OTP (or PIN code) from the target wireless device 102B. After successful authorization of the cellular wireless transfer, the target wireless device 102B with the OEM activation server 452, at 590, can trigger download, installation, and activation of the cellular wireless service eSIM profile to the target wireless device 102B.

Figure 6A:
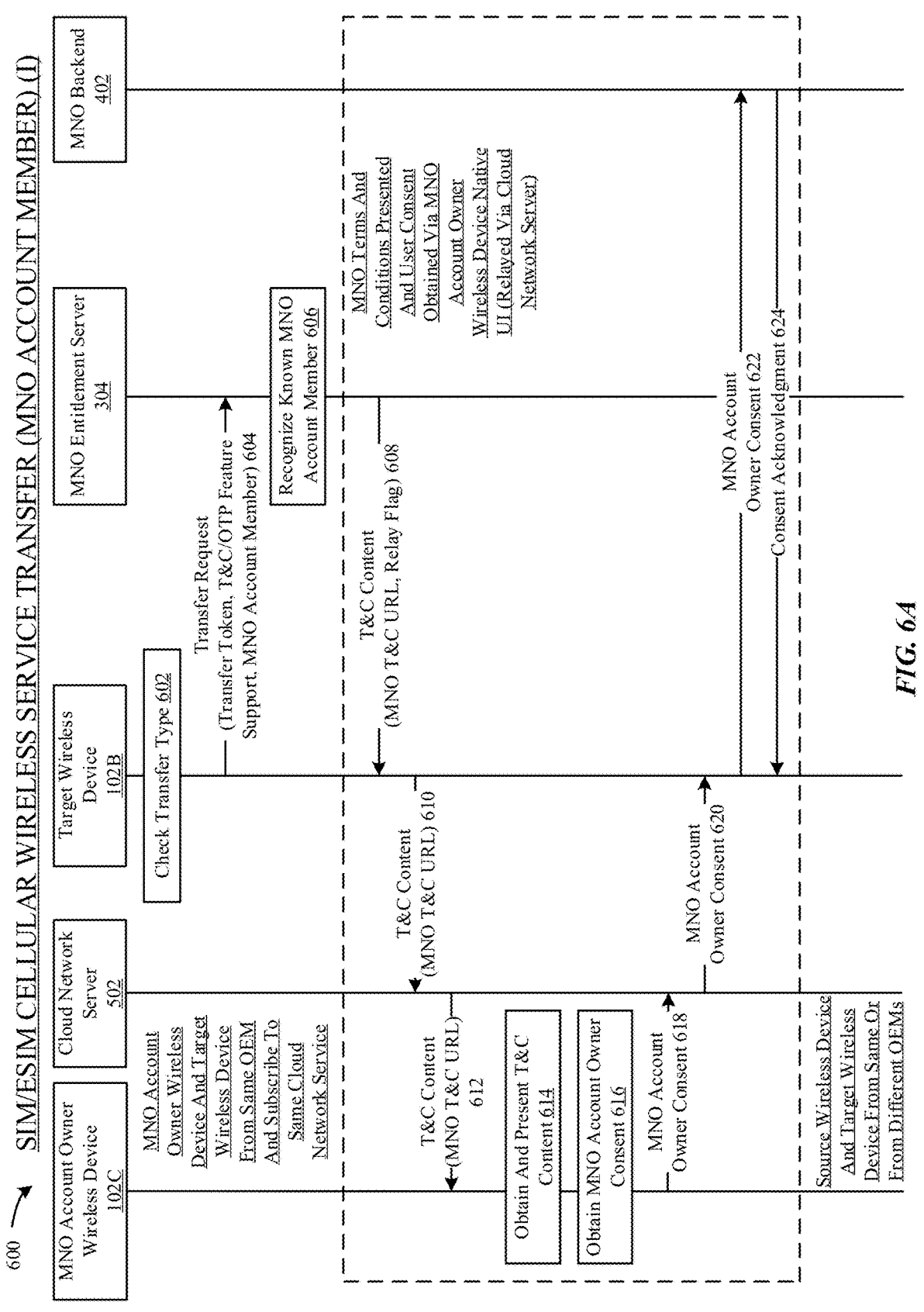
FIGS. 6A and 6B illustrate an exemplary sequence of actions to transfer cellular wireless service from a source wireless device to a target wireless device belonging to an MNO account member, according to some embodiments.

FIG. 6A illustrates a diagram 600 of an exemplary sequence of actions to transfer cellular wireless service of a SIM or eSIM 208 of a source wireless device 102A to a target wireless device 102B with consent of an MNO account owner. In the example of FIG. 6A: i) the target wireless device 102B belongs to an MNO account member that is not the MNO account owner, ii) each of the target wireless device 102B and an MNO account owner wireless device 102C are manufactured by the same OEM, and iii) the target wireless device 102B and the MNO account owner wireless device 102C both subscribe to the same cloud network service, e.g., to a common cloud service account or to a set of related cloud service accounts, such as via a family sharing arrangement. The source wireless device 102A (not shown) can be manufactured by the same OEM as the target wireless device 102B or by a different OEM. At 602, the target wireless device 102B determines a type of cellular wireless service transfer to be performed, e.g., the transfer is based on a previously obtained transfer token or is part of an on-device activation procedure, by an MNO account owner or an MNO account member to which the target wireless device 102B belongs. At 604, the target wireless device 102B sends to the MNO entitlement server 304 a transfer request message, which can include: i) a transfer token obtained from the source wireless device 102A, ii) an indication of support for a feature regarding handling and/or displaying terms and conditions information and/or OTPs, and iii) an indication that the target wireless device 102B belongs to an MNO account member (not the MNO account owner) that is associated with an MNO account for which cellular wireless service is being transferred to the target wireless device 102B. At 606, the MNO entitlement server 304 can recognize that the transfer request message is from a known MNO account member of the MNO account, and that terms and conditions can be relayed via the target wireless device 102B to an MNO account owner wireless device 102C. At 608, the MNO entitlement server 304 sends an message to the target wireless device 102B, the message including: i) terms and conditions information, e.g., a network address (URL value) for an MNO server from which the MNO account owner wireless device 102C can obtain the terms and conditions for transfer of the cellular wireless service, and ii) a relay flag indicating that the terms and conditions information should be forwarded to the MNO account owner wireless device 102C. At 610, the target wireless device 102B forwards the terms and conditions information, e.g., an MNO server network address (URL value), to a cloud network server 502 of a cloud network service, which forwards the terms and conditions information, at 612, to the MNO account owner wireless device 102C. In some embodiments, the terms and conditions information can be communicated from the target wireless device 102B to the MNO account owner wireless device 102C via a peer-to-peer connection between them, such as a local wireless Bluetooth link. At 614, the MNO account owner wireless device 102C obtains and presents the terms and conditions content via a native operating system user interface (UI) of the MNO account owner wireless device 102C. This feature allows for presenting the terms and conditions information of different MNOs in a consistent manner at the MNO account owner wireless device 102C. At 616, the MNO account owner wireless device 102C obtains consent of the MNO account owner. At 618, the MNO account owner wireless device 102C sends, to the cloud network server 502 of the cloud network service, an indication of consent (agreement) of the MNO account owner for transfer of the cellular wireless service to the target wireless device 102B. At 620, the cloud network server 502 of the cloud network service forwards the indication of consent (agreement) of the MNO account owner to the target wireless device 102B. At 622, the target wireless device 102B forwards to an MNO backend system 402 the indication of consent (agreement) of the MNO account owner for transfer of the cellular wireless service to the target wireless device 102B. At 624, the MNO backend system 402 provides to the target wireless device 102B a message indicating acknowledgment of receipt of the MNO account owner consent.

Figure 6B:
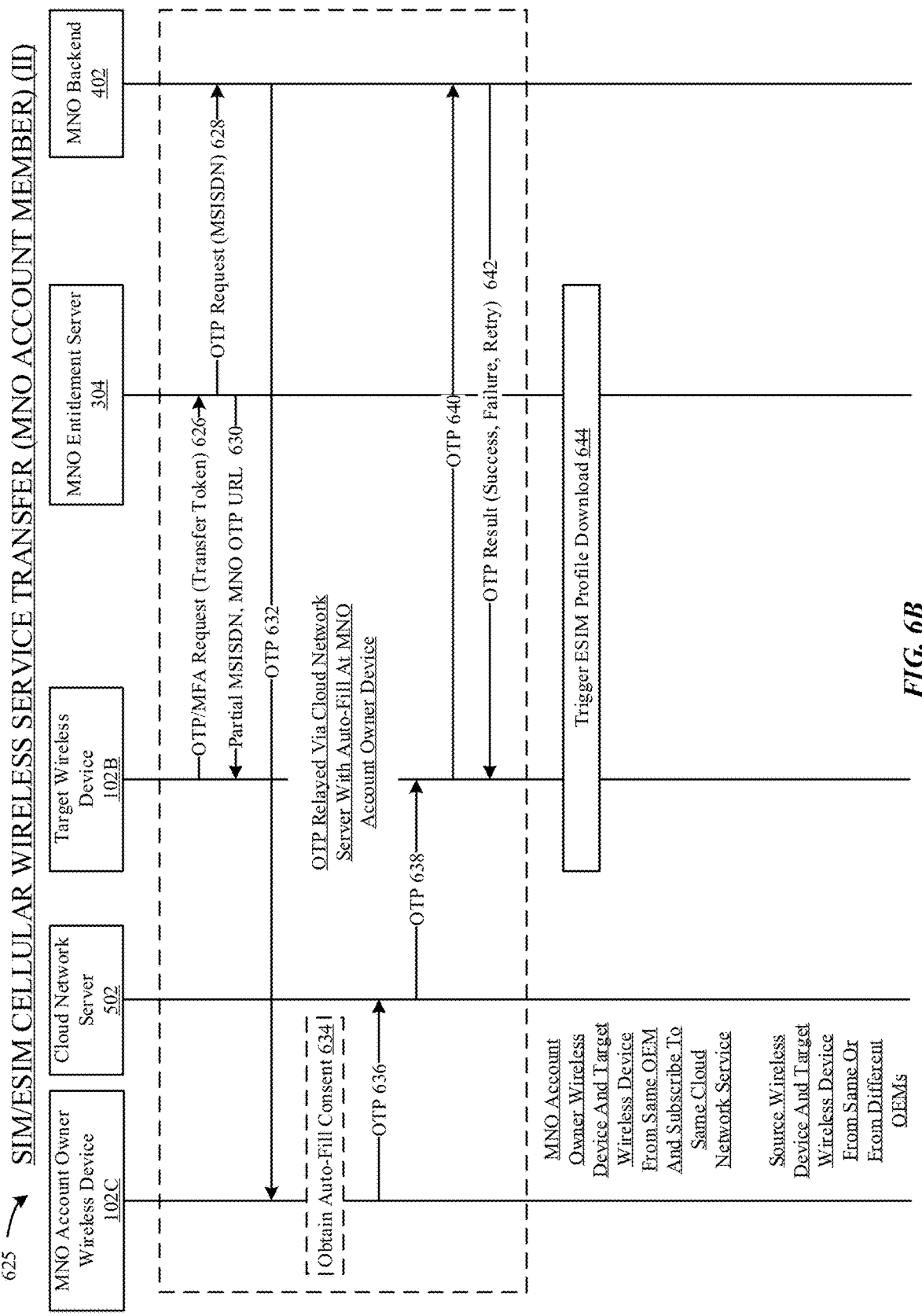

FIG. 6B illustrates a diagram 625 of an exemplary sequence of actions that continues the procedure from FIG. 6A for transfer cellular wireless service of a SIM or eSIM 208 of a source wireless device 102A to a target wireless device 102B with consent of an MNO account owner. In some embodiments, the MNO 114 requires an additional multi-factor authentication (MFA) via an OTP (or PIN code). The OTP (or PIN code) can be relayed to the target wireless device 102B via the MNO account owner wireless device 102C when both subscribe to a cloud network service and are known to be related to each other. For example family members of a common cloud network service account or set of related cloud network service accounts, such as via a family sharing arrangement. At 626, the target wireless device 102B sends a message to the MNO entitlement server 304 requesting transmission of the OTP (or PIN code). In some embodiments, the message includes the transfer token to indicate authority to request the OTP (or PIN code). At 628, the MNO entitlement server 304 sends to the MNO backend system 402 a request for the OTP (or PIN code), the request including a mobile station international subscriber directory number (MSISDN) value for the cellular wireless service that is associated with the eSIM 208 of the source wireless device 102A and is being transferred to the target wireless device 102B. At 630, the MNO entitlement server 304 can send a message back to the target wireless device 102B that includes the MSISDN value (or a last portion thereof) and a network address, e.g., a URL value, for an MNO server to which the OTP (or PIN code) can be returned as part of the additional MFA. The MNO backend system 402, at 632, sends the OTP (or PIN code request) to the MNO account owner wireless device 102C. In some embodiments, at 634, the OTP is automatically filled (or made available for a one-click consent to fill) and returned at 636 to a cloud network server 502 of a cloud network service to which both the MNO account owner wireless device 102C and the target wireless device 102B subscribe (e.g., via a common cloud network service account or via related cloud network service accounts, such as via a family sharing arrangement). In some embodiments, a user of the MNO account owner wireless device 102C enters a PIN code that is forwarded to the cloud network server 502. The cloud network server 502, at 638, forwards the OTP (or PIN code) to the target wireless device 102B, which can forward the OTP (or PIN code) at 640 to the MNO server previously indicated by the MNO OTP URL received at 630. This MNO server can be part of the MNO backend system 402 and can confirm the additional MFA for transfer of the cellular wireless service from the source wireless device 102A to the target wireless device 102B. At 642, the MNO backend system 402 returns to the target wireless device 102B a result (e.g., success, failure, or retry) responsive to receipt of the OTP (or PIN code) from the target wireless device 102B. After successful authorization of the cellular wireless transfer, the target wireless device 102B with the MNO entitlement server 304, at 644, can trigger transfer of the cellular wireless service eSIM profile (which can include in some cases downloading a new eSIM profile) to the target wireless device 102B.

Figure 6C:
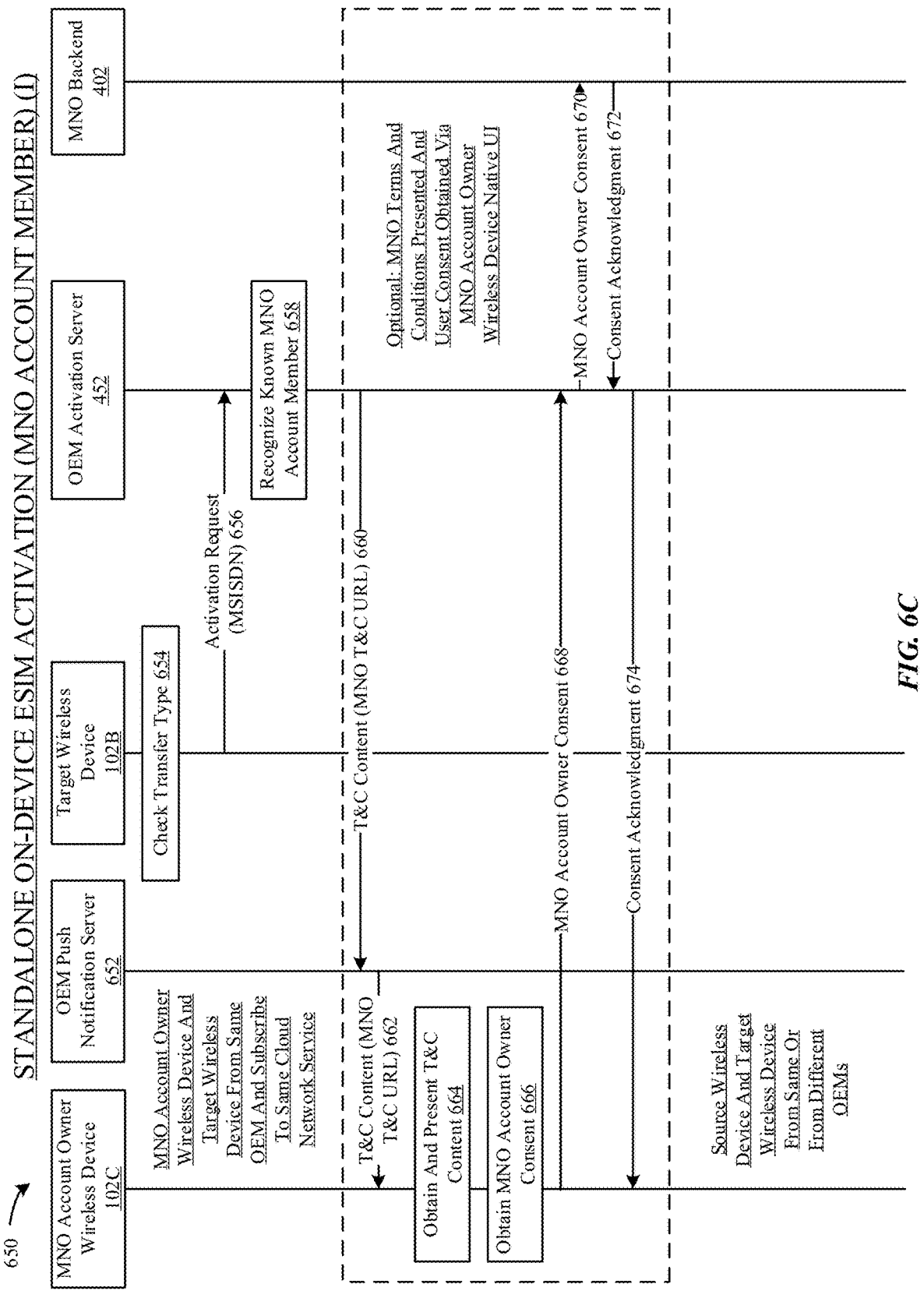

FIG. 6C illustrates a diagram 650 of an exemplary sequence of actions to activate an eSIM 208 on a target wireless device 102B belonging to an MNO account member of an MNO account (other than the MNO account owner) as part of transfer of cellular wireless service from a source wireless device 102A to the target wireless device 102B with consent of the MNO account owner. In the example of FIG. 6B: i) the target wireless device 102B belongs to an MNO account member that is not the MNO account owner, ii) each of the target wireless device 102B and an MNO account owner wireless device 102C are manufactured by the same OEM, and iii) the target wireless device 102B and the MNO account owner wireless device 102C both subscribe to the same cloud network service, e.g., to a common cloud service account or to a set of related cloud service accounts, such as via a family sharing arrangement. The source wireless device 102A (not shown) can be manufactured by the same OEM or by different OEMs. At 654, the target wireless device 102B determines a type of cellular wireless service transfer to be performed, e.g., the transfer is based on a reservation of a new eSIM 208 for the target wireless device 102B that will take over a cellular wireless service subscription from a SIM or eSIM 208 of the source wireless device 102A. At 656, the target wireless device 102B sends to an OEM activation server 452 an activation request message, which can include an MSISDN value for the cellular wireless service that is associated with the eSIM 208 of the source wireless device 102A and is being transferred to the target wireless device 102B. At 658, the OEM activation server 452 can recognize that the activation request message is from a known MNO account member of an MNO account. At 660, the OEM activation server can provide, to an OEM push notification server 652, terms and conditions information, e.g., a network address (URL value) for an MNO server from which an MNO account owner wireless device 102C can obtain, review, and approve terms and conditions for transfer of cellular wireless service from a source wireless device 102A to the target wireless device 102B. The MNO account owner wireless device can be manufactured by the OEM that manages the OEM activations server 452 and can receive push notification messages from the OEM push notification server 652. The OEM push notification server 652, at 662, sends the terms and conditions information, e.g., network address (URL value) for an MNO server, to the MNO account owner wireless device 102C. At 664, the MNO account owner wireless device 102C obtains and presents the terms and conditions content via a native operating system user interface (UI) of the MNO account owner wireless device 102C. This feature allows for presenting the terms and conditions information of different MNOs in a consistent manner at the MNO account owner wireless device 102C. At 666, the MNO account owner wireless device 102C obtains consent of the MNO account owner. At 668, the MNO account owner wireless device 102C provides the MNO account owner consent to the terms and conditions for transfer of the cellular wireless service to the OEM activation server 452. At 670, the OEM activation server 452 forwards the MNO account owner consent to the MNO backend system 402. At 672, the MNO backend system 402 provides to the OEM activation server 452 a message indicating acknowledgment of receipt of the MNO account owner consent. At 674, the OEM activation server 452 forwards the message indicating acknowledgment of receipt of the MNO account owner consent to the MNO account owner wireless device 102C.

FIG. 6D illustrates a diagram 675 of an exemplary sequence of actions that continues the procedure from FIG. 6C for activation of an eSIM on a target wireless device 102B as part of transfer of cellular wireless service from a source wireless device 102A to the target wireless device 102B with consent of the MNO account owner. In some embodiments, the MNO 114 requires an additional multi-factor authentication (MFA) via an. The OTP can be relayed to the target wireless device 102B via the MNO account owner wireless device 102C when both subscribe to a cloud network service and are known to be related to each other. For example family members of a common cloud network service account or set of related cloud network service accounts. At 676, the target wireless device 102B sends a message to the OEM activation server 452 requesting transmission of the OTP. At 680, the OEM activation server 452 sends to the MNO backend system 402 a request for the OTP, the request including a mobile station international subscriber directory number (MSISDN) value for the cellular wireless service that is associated with the eSIM 208 of the source wireless device 102A and is being transferred to the target wireless device 102B. At 682, the OEM activation server 452 can send a message back to the target wireless device 102B that includes the MSISDN value (or a last portion thereof) and a network address, e.g., a URL value, for an MNO server to which the OTP can be returned as part of the additional MFA. The MNO backend system 402, at 684, sends the OTP to the MNO account owner wireless device 102C. In some embodiments, at 686, the OTP is automatically filled (or made available for a one-click consent to fill) and returned at 688 to a cloud network server 502 of a cloud network service to which both the MNO account owner wireless device 102C and the target wireless device 102B subscribe (e.g., via a common cloud network service account or via related cloud network service accounts, such as via a family sharing arrangement). The cloud network server 502, at 690, forwards the OTP to the target wireless device 102B, which can forward the OTP at 692 to the MNO server previously indicated by the MNO OTP URL received at 682. This MNO server can be part of the MNO backend system 402 and can confirm the additional MFA for transfer of the cellular wireless service from the source wireless device 102A to the target wireless device 102B. At 694, the MNO backend system 402 returns to the target wireless device 102B a result (e.g., success, failure, or retry) responsive to receipt of the OTP from the target wireless device 102B. After successful authorization of the cellular wireless transfer, the target wireless device 102B with the OEM activation server 452, at 696, can trigger download, installation, and activation of the cellular wireless service eSIM profile to the target wireless device 102B.

Figure 7:
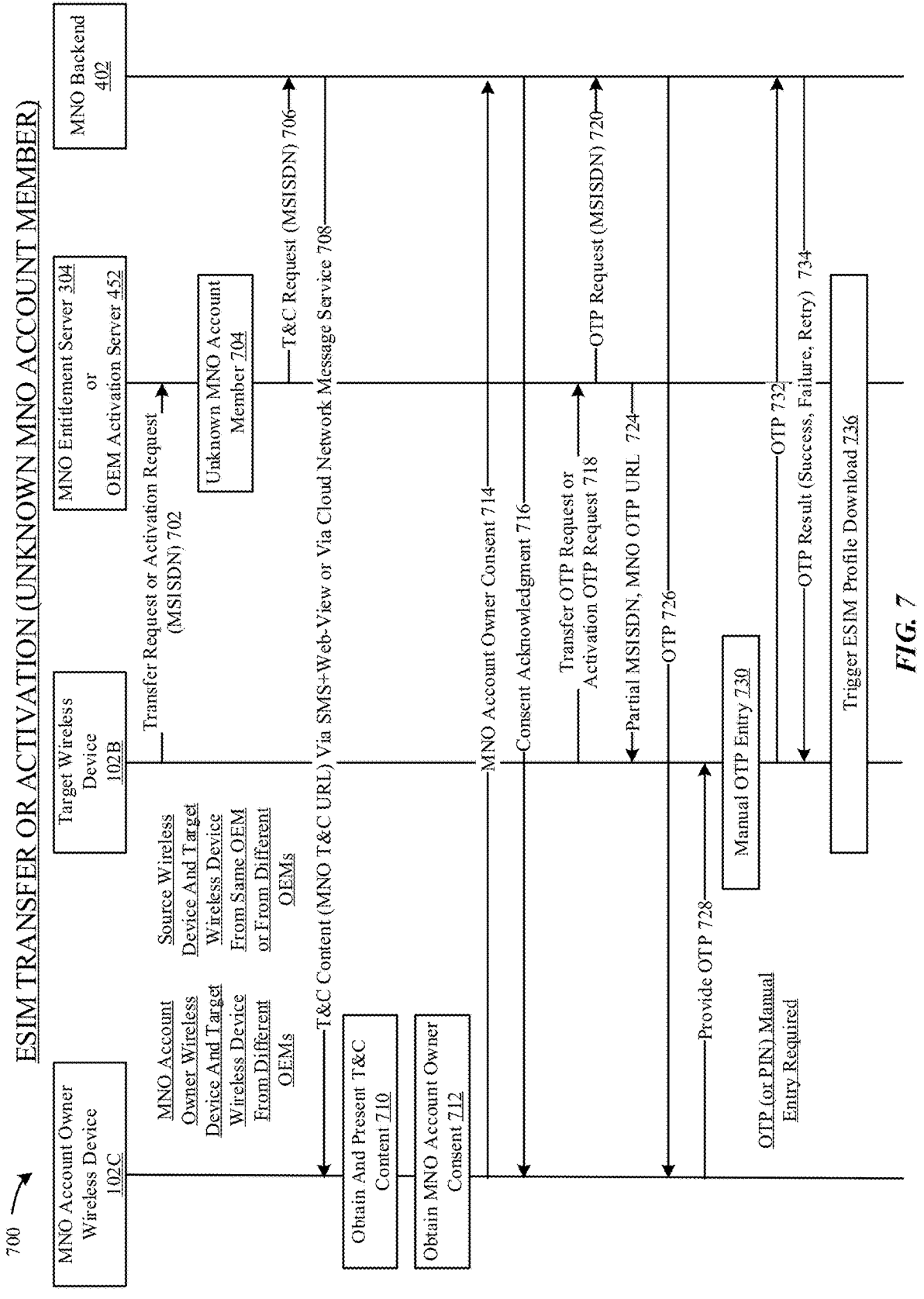
FIG. 7 illustrates another exemplary sequence of actions to transfer an eSIM to or activate an eSIM on a target wireless device belonging to an MNO account member as part of transfer of cellular wireless service from a source wireless device to the target wireless device, according to some embodiments.

FIG. 7 illustrates a diagram 700 of another exemplary sequence of actions to transfer an eSIM 208 to or activate an eSIM 208 on a target wireless device 102B belonging to an unknown MNO account member as part of a transfer of cellular wireless service from a source wireless device 102A to the target wireless device 102B. In the example of FIG. 7: i) the target wireless device 102B belongs to an MNO account member that is not the MNO account owner, ii) the target wireless device 102B and an MNO account owner wireless device 102C are manufactured by different OEMs, and iii) the source wireless device 102A and the target wireless device 102B can be manufactured by the same OEM or by different OEMs. At 702, the target wireless device 102B either a transfer request message to an MNO entitlement server 304 or an activation request message to an OEM activation server 452. The activation request message can include an MSISDN value for the cellular wireless service that is associated with the eSIM 208 of the source wireless device 102A and is being transferred to the target wireless device 102B. At 704, the MNO entitlement server 304 or the OEM activation server 452 can determine that the transfer request message or the activation request message is from an unknown member of an MNO account. At 706, the MNO entitlement server 304 or the OEM activation server 452 sends a request message to an MNO backend system 402 to handle communication of terms and conditions for transfer of cellular wireless service from the source wireless device 102A to the target wireless device 102B. The request message can include the MSISDN value for the cellular wireless service that is associated with the eSIM 208 of the source wireless device 102A and is being transferred to the target wireless device 102B. At 708, the MNO backend system sends to the MNO account owner wireless device 102C terms and conditions information, e.g., a network address (URL value) for a server from which to obtain the terms and conditions for transfer of the cellular wireless service from the source wireless device 102A to the target wireless device 102B. In some cases, the terms and conditions information can be sent via a cloud network message service. In some cases, the terms and conditions information can be sent through a short message service (SMS) message. In some embodiments, the terms and conditions information can be communicated from the target wireless device 102B to the MNO account owner wireless device 102C via a peer-to-peer connection between them, such as over a local wireless Bluetooth link. At 710, the MNO account owner wireless device 102C can obtain and present terms and conditions for transfer of the cellular wireless service. At 712, the MNO account owner wireless device 102C can obtain consent from the MNO account owner for transfer of the cellular wireless service. At 714, the MNO account owner wireless device 102C provides the MNO account owner consent to the terms and conditions for transfer of the cellular wireless service to the MNO backend system 402. At 716, the MNO backend system 402 provides to the MNO account owner wireless device 102C a message indicating acknowledgment of receipt of the MNO account owner consent.

In some embodiments, the MNO 114 requires an additional multi-factor authentication (MFA) via an OTP (or PIN code). At 718, the target wireless device 102B sends a message (e.g., Transfer OTP Request) to the MNO entitlement server 304 or a message (e.g., Activation OTP Request) to the OEM activation server requesting transmission of the OTP. At 720, the MNO entitlement server 304 or the OEM activation server 452 forwards the request for the OTP to the MNO backend system 402. The request for the OTP can include a mobile station international subscriber directory number (MSISDN) value for the cellular wireless service that is associated with the eSIM 208 of the source wireless device 102A and is being transferred to the target wireless device 102B. At 724, the MNO entitlement server 304 of the OEM activation server 452 can send a message back to the target wireless device 102B that includes the MSISDN value (or a last portion thereof) and a network address, e.g., a URL value, for an MNO server to which the OTP can be returned as part of the additional MFA. The MNO backend system 402, at 726, sends the OTP to the MNO account owner wireless device 102C. As the MNO account owner wireless device 102C and the target wireless device 102B are manufactured by different OEMs there may not be a common cloud service account by which to forward to the OTP from the MNO account owner wireless device 102C to the target wireless device 102B. The MNO account owner wireless device 102C, at 728, provides the OTP to the target wireless device 102B by an out-of-band communication channel, e.g., via a telephone call, a message service, a visual presentation at the MNO account owner wireless device

102C to allow for a user of the target wireless device 102B to read and copy. At 730, the OTP is manually entered to the target wireless device 102B and forwarded to the MNO backend system 402 at 732 to confirm authentication of the target wireless device 102B for transfer of the cellular wireless service from the source wireless device 102A. At 734, the MNO backend system 402 returns to the target wireless device 102B a result (e.g., success, failure, or retry) responsive to receipt of the OTP from the target wireless device 102B. After successful authorization of the cellular wireless transfer, the target wireless device 102B with the MNO entitlement server 304 or the OEM activation server 452, at 736, can trigger download, installation, and activation of the cellular wireless service eSIM profile to the target wireless device 102B.

Figure 8A:
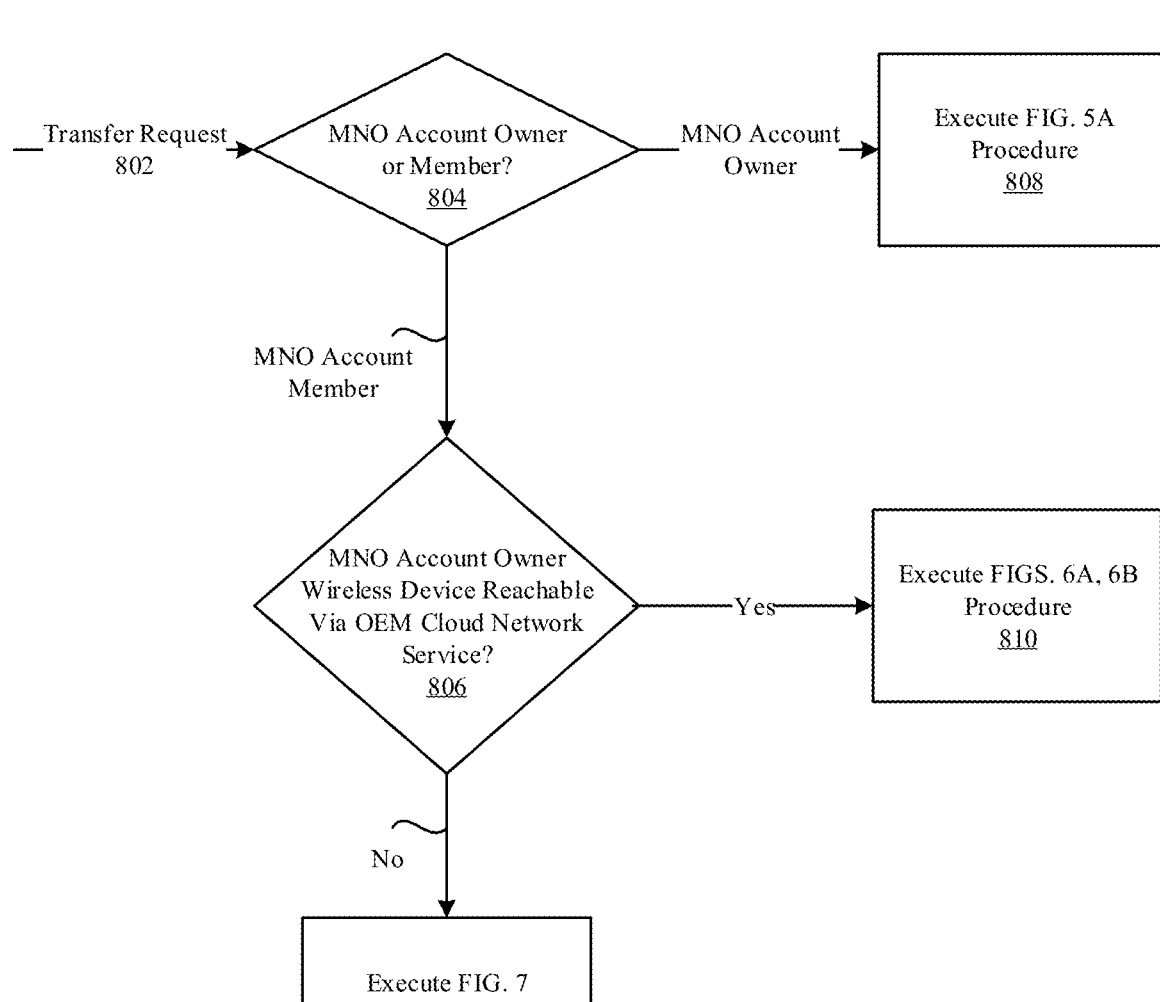
FIG. 8A illustrates a decision tree performed by an MNO entitlement server to determine which sequence of actions to perform for transfer of cellular wireless service from a source wireless device to a target wireless device, according to some embodiments.

FIG. 8A illustrates a flowchart 800 of a decision tree performed by an MNO entitlement server 304 to determine which sequence of actions to perform upon receipt of a message from a target wireless device 102B, the message requesting transfer of a cellular wireless service from a source wireless device 102A to the target wireless device 102B. At 802, the MNO entitlement server 304 receives the transfer request message. At 804, the MNO entitlement server 304 determines whether the target wireless device 102B, from which the transfer request message was received, belongs to an owner of an MNO account to which the cellular wireless service to be transferred is associated or to an MNO account member (other than the owner) of the MNO account. When the target wireless device 102B belongs to an MNO account owner, the MNO entitlement server 304, at 808, executes the sequence of actions of the procedure illustrated in FIG. 5A. When the target wireless device 102B belongs to an MNO account member (other than the owner), the MNO entitlement server 304, at 806, determines whether an MNO account owner wireless device 102C is reachable via an OEM cloud network service, e.g., when the target wireless device 102B and the MNO account owner wireless device 102C are manufactured by the same OEM and both subscribe to the OEM cloud network service, e.g., to a common cloud network account or to a set of related cloud network accounts, such as via a family sharing arrangement. In some embodiments, the MNO entitlement server 304, at 806, determines whether the MNO account owner wireless device 102C is manufactured by a particular OEM and therefore uses a particular operating system, e.g., manufactured by Apple and uses iOS. When the MNO account owner wireless device 102C is reachable via the OEM cloud network service, the MNO entitlement server 304, at 810, executes the sequence of actions of the procedure illustrated in FIGS. 6A and 6B. When the MNO account owner wireless device 102C is not reachable via the OEM cloud network service, the MNO entitlement server 304, at 812, executes the sequence of actions of the procedure illustrated in FIG. 7.

Figure 8B:
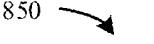
FIG. 8B illustrates a decision tree performed by an original equipment manufacturer (OEM) activation server to determine which sequence of actions to perform for transfer of cellular wireless service from a source wireless device to a target wireless device, according to some embodiments.

FIG. 8B illustrates a flowchart 850 of a decision tree performed by an OEM activation server 452 to determine which sequence of actions to perform upon receipt of a message from a target wireless device 102B, the message requesting activation of an eSIM 208 previously reserved for the target wireless device 102B and associated with transfer of cellular wireless service from a source wireless device 102A to the target wireless device 102B. At 852, the OEM activation server 452 receives the transfer request message. At 854, the OEM activation server 452 determines whether the target wireless device 102B, from which the transfer request message was received, belongs to an owner of an MNO account to which the cellular wireless service to be transferred is associated or to an MNO account member (other than the owner) of the MNO account. When the target wireless device 102B belongs to an MNO account owner, the OEM activation server 452, at 858, executes the sequence of actions of the procedure illustrated in FIG. 5B. When the target wireless device 102B belongs to an MNO account member (other than the owner), the OEM activation server 452, at 856, determines whether an MNO account owner wireless device 102C is reachable via an OEM push network service and an OEM cloud network service, e.g., when the target wireless device 102B and the MNO account owner wireless device 102C are manufactured by the same OEM and both subscribe to the OEM cloud network service, e.g., to a common cloud network account or to a set of related cloud network accounts, such as via a family sharing arrangement. In some embodiments, the MNO entitlement server 304, at 806, determines whether the MNO account owner wireless device 102C is manufactured by a particular OEM and therefore uses a particular operating system, e.g., manufactured by Apple and uses iOS. When the MNO account owner wireless device 102C is reachable via the OEM push network service and via the OEM cloud network service, the OEM activation server 452, at 860, executes the sequence of actions of the procedure illustrated in FIGS. 6C and 6D. When the MNO account owner wireless device 102C is not reachable via the OEM push network service or via the OEM cloud network service (or is not manufactured by a particular OEM and therefore does not use a particular operating system, e.g., not manufactured by Apple and not using iOS), the MNO entitlement server 304, at 862, executes the sequence of actions of the procedure illustrated in FIG. 7.

FIG. 9A illustrates a flowchart 800 of an exemplary method performed by a target wireless device 102B for transfer of cellular wireless service of an MNO account from a source wireless device 102A to the target wireless device 102B with MNO account owner consent. At 902, the target wireless device 102B sends to a network server, a first message to request transfer of the cellular wireless service of the MNO account, the first message including an indication that the target wireless device 102B belongs to an owner of the MNO account. At 904, the target wireless device 102B receives, from the network server, a first network address of an MNO network server from which to obtain terms and conditions content for the transfer of the cellular wireless service. In some embodiments, at 906, the target wireless device 102B displays, via a native operating system user interface of the target wireless device 102B, the terms and conditions content obtained from the MNO network server. At 908, the target wireless device 102B, responsive to receipt of an indication of consent to the terms and conditions content by the owner of the MNO account, sends the indication of consent to an MNO backend system.

In some embodiments, the method performed by the target wireless device 102B further includes the target wireless device 102B: i) sending, to the network server, a second message to obtain a one-time passcode for additional authentication for transfer of the cellular wireless service, ii) receiving, from the network server, a second network address for a second MNO network server for receipt of the one-time passcode, iii) obtaining, from the source wireless device 102A, the one-time passcode, and iv) sending, to the second MNO network server, the one-time passcode. In some embodiments, the method performed by the target wireless device 102B further includes the target wireless device 102B: v) responsive to successful authentication with the second MNO network server using the one-time passcode, obtaining an eSIM 208 from an MNO provisioning server 116, and vi) installing the eSIM 208 on an eUICC 108B of the target wireless device 102B, where the eSIM 208 includes credentials for the target wireless device 102B to access the cellular wireless service of the MNO account. In some embodiments: i) the target wireless device 102B and the source wireless device 102A are manufactured by the same original equipment manufacturer (OEM), ii) the target wireless device and 102B the source wireless device 102A are both registered with a cloud network service of the OEM, and iii) the target wireless device 102B obtains the one-time passcode from the source wireless device 102A via the cloud network service of the OEM. In some embodiments, the target wireless device 102B and the source wireless device 102A are each registered with a common account of the cloud network service of the OEM. In some embodiments, the target wireless device 102B and the source wireless device 102A are each registered with separate but related accounts of the cloud network service of the OEM, e.g., via a family account relationship between the accounts. In some embodiments, the target wireless device 102B and the source wireless device 102A are manufactured by different OEMs, and the method further includes receiving entry of the one-time passcode at the target wireless device 102B, via a native operating system user interface. In some embodiments, the network server includes an MNO entitlement server 304, and the first message to request transfer of the cellular wireless service of the MNO account further includes a transfer token indicating authorization to transfer the cellular wireless service associated with a SIM or eSIM 208 of the source wireless device 102A to the target wireless device 102B. In some embodiments, the network server includes an OEM activation server 452, and the first message to request transfer of the cellular wireless service of the MNO account includes a request to activate an eSIM 208 reserved for the target wireless device 102B. In some embodiments, the first message to request transfer of the cellular wireless service of the MNO account further includes an indication of support for displaying terms and conditions via a native operating system user interface of the target wireless device 102B. In some embodiments, the first message to request transfer of the cellular wireless service of the MNO account further includes an MSISDN value for the cellular wireless service to transfer to the target wireless device 102B.

FIG. 9B illustrates a flowchart 920 of an exemplary method performed by an MNO account owner wireless device 102C to transfer cellular wireless service from a source wireless device 102A to a target wireless device 102B with MNO account owner consent. At 922, the MNO account wireless device 102C receives terms and conditions content for transfer of the cellular wireless service from the source wireless device 102A to the target wireless device 102B. In some embodiments, at 924, the MNO account owner wireless device 102C displays, via a native operating system user interface of the MNO account owner wireless device 102C, the terms and conditions content. At 926, the MNO account owner wireless device 102C, responsive to receipt of an indication of consent to the terms and conditions by the MNO account owner, sends the indication of consent to an MNO backend system 402, where the target wireless device 102B belongs to a member of the MNO account other than the MNO account owner.

In some embodiments: i) the target wireless device 102B and the MNO account owner wireless device 102C are manufactured by the same OEM, ii) the target wireless device 102B and the MNO account owner wireless device 102C are both registered with a cloud network service of the OEM, and iii) the terms and conditions information is received from the target wireless device 102B via the cloud network service of the OEM. In some embodiments, the terms and conditions information is communicated from the target wireless device 102B to the MNO account owner wireless device 102C via a peer-to-peer connection between them, such as over a local wireless Bluetooth link. In some embodiments, the target wireless device 102B and the MNO account owner wireless device 102C are each registered with a common account of the cloud network service of the OEM. In some embodiments, the target wireless device 102B and the MNO account owner wireless device 102C are each registered with separate but related accounts of the cloud network service of the OEM, e.g., via a family account relationship between the accounts. In some embodiments, the target wireless device 102B and the MNO account owner wireless device 102C are manufactured by the same OEM, and the terms and conditions information is received via a push notification message received from a push notification message server 652 of the OEM. In some embodiments, the push notification message including the terms and conditions information is sent responsive to a request for activation of an eSIM 208 reserved for the target wireless device 102B and associated with transfer of the cellular wireless service from the source wireless device 102A to the target wireless device 102B. In some embodiments, the method performed by the MNO account owner wireless device 102C further includes the MNO account owner wireless device 102C: i) receiving, from an MNO backend system 402, a one-time passcode for additional authentication for transfer of the cellular wireless service, ii) automatically filling the one-time passcode into a reply message, and iii) sending the reply message that includes the one-time passcode to the target wireless device 102B to provide to the MNO backend system 402. In some embodiments: i) the target wireless device 102B and the MNO account owner wireless device 102C are manufactured by the same OEM, ii) the target wireless device 102B and the MNO account owner wireless device 102C are both registered with a cloud network service of the OEM, and iii) the method further includes sending the one-time passcode to the target wireless device 102B via the cloud network service of the OEM. In some embodiments, the target wireless device 102B and the MNO account owner wireless device 102C are each registered with a common account of the cloud network service of the OEM. In some embodiments, the target wireless device 102B and the MNO account owner wireless device 102C are each registered with separate but related accounts of the cloud network service of the OEM, e.g., via a family account relationship between the accounts.

FIG. 9C illustrates a flowchart 940 of a method performed by an MNO entitlement server 304 for multi-factor authentication with owner consent for transfer of cellular wireless service of an MNO account from a source wireless device 102A to a target wireless device 102B. At 942, the MNO entitlement server 304 receives, from the target wireless device 102B, a first message to transfer the cellular wireless service of the MNO account, the first message including an indication that the target wireless device 102B belongs to an owner of the MNO account or to a member of the MNO account other than the owner of the MNO account. At 944, the MNO entitlement server 304 sends, to the target wireless device 102B, a first network address of an MNO server from which to obtain terms and conditions content for the transfer of the cellular wireless service. At 946, the MNO entitlement server 304 receives, from the target wireless device 102B, a second message to obtain a one-time passcode for additional authentication for transfer of the cellular wireless service. At 948, the MNO entitlement server 304, sends, to the target wireless device 102B, a second network address for a second MNO server to which the one-time passcode is to be sent to confirm the additional authentication for transfer of the cellular wireless service.

In some embodiments, the method further includes the MNO entitlement server 304 sending, to an MNO backend system 402, a request message for the one-time passcode. In some embodiments, the first message from the target wireless device 102B includes an MSISDN value for the cellular wireless service to be transferred to the target wireless device 102B, and the request message for the one-time passcode includes the MSISDN value for the cellular wireless service to be transferred to the target wireless device 102B. In some embodiments, the first message to transfer the cellular wireless service of the MNO account further includes an indication of support for displaying terms and conditions via a native operating system user interface of the target wireless device 102B. In some embodiments, the method further includes the MNO entitlement server 304 sending to the target wireless device 102B, with the first network address of the MNO server from which to obtain terms and conditions content for the transfer of the cellular wireless service, when the first message indicates that the target wireless device 102B belongs to the member of the MNO account other than the owner of the MNO account, a relay flag indicating that target wireless device 102B should forward the first network address to a wireless device of the owner of the MNO account for acceptance of the terms and conditions.

Representative Device

FIG. 10 illustrates a detailed view of a representative computing device 1000 that can be used to implement various methods described herein, according to some embodiments. In particular, the detailed view illustrates various components that can be included in a wireless device 102, such as a source wireless device 102A, and/or a target wireless device 102B. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 that can be controlled by the processor 1002 to display information to the user. A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that communicatively couples to a data link 1012. In the case of a wireless connection, the network/bus interface 1011 can include a wireless transceiver.

The computing device 1000 also includes a storage device 1040, which can comprise a single disk or a plurality of disks (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory (RAM) 1020 and a Read-Only Memory (ROM) 1022. The ROM 1022 can store programs, utilities or processes to be executed in a non-volatile manner. The RAM 1020 can provide volatile data storage, and stores instructions related to the operation of the computing device 1000. The computing device 1000 can further include a secure element (SE) 1024, such as an eUICC 108, a UICC 118, or another secure storage for cellular wireless system access by a wireless device 102, a source wireless device 102A, and/or a target wireless device 102B.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution- Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for multi-factor authentication with owner consent for transfer of cellular wireless service of a multi-user mobile network operator (MNO) account from a source wireless device to a target wireless device, the method comprising:

by the target wireless device:

sending, to a network server, a first message to request transfer of the cellular wireless service of the multi-user MNO account, the first message including an indication that the target wireless device belongs to an owner of the multi-user MNO account;

receiving, from the network server, a first network address of an MNO network server from which to obtain terms and conditions content for the transfer of the cellular wireless service; and responsive to receipt of an indication of consent to the terms and conditions content by the owner of the multi-user MNO account, sending the indication of consent to an MNO backend system, wherein:

the multi-user MNO account comprises the owner of the multi-user MNO account and one or more MNO account members, the owner of the multi-user MNO account is authorized to manage the multi-user MNO account, and the one or more MNO account members require confirmation of authorization by the owner of the multi-user MNO account to transfer the cellular wireless service to another wireless device.

2. The method of claim 1, further comprising:

by the target wireless device:

displaying, via a native operating system user interface of the target wireless device, the terms and conditions content obtained from the MNO network server.

3. The method of claim 1, further comprising:

by the target wireless device:

sending, to the network server, a second message to obtain a one-time passcode for additional authentication for transfer of the cellular wireless service;

receiving, from the network server, a second network address for a second MNO network server for receipt of the one-time passcode;

obtaining, from the source wireless device, the one-time passcode; and sending, to the second MNO network server, the one-time passcode.

4. The method of claim 3, further comprising:

by the target wireless device:

responsive to successful authentication with the second MNO network server using the one-time passcode, obtaining an electronic subscriber identity module (eSIM) from an MNO provisioning server; and installing the eSIM on an embedded Universal Integrated Circuit Card (eUICC) of the target wireless device, wherein the eSIM includes credentials for the target wireless device to access the cellular wireless service of the multi-user MNO account.

5. The method of claim 3, wherein:

the target wireless device and the source wireless device are manufactured by a same original equipment manufacturer (OEM);

the target wireless device and the source wireless device are both registered with a cloud network service of the OEM; and the target wireless device obtains the one-time passcode from the source wireless device via the cloud network service of the OEM.

6. The method of claim 3, wherein:

the target wireless device and the source wireless device are manufactured by different OEMs; and the method further comprises receiving entry of the one-time passcode at the target wireless device, via a native operating system user interface.

7. The method of claim 1, wherein:

the network server comprises an original equipment manufacturer (OEM) activation server; and the first message to request transfer of the cellular wireless service of the multi-user MNO account comprises a request to activate an electronic subscriber identity module (eSIM) reserved for the target wireless device.

8. The method of claim 1, wherein the first message to request transfer of the cellular wireless service of the multi-user MNO account further comprises an indication of support for displaying terms and conditions via a native operating system user interface of the target wireless device.

9. The method of claim 1, wherein the first message to request transfer of the cellular wireless service of the multi-user MNO account further comprises a mobile station international subscriber directory number (MSISDN) value for the cellular wireless service to transfer to the target wireless device.

10. A method multi-factor authentication with owner consent for transfer of cellular wireless service of a multi-user mobile network operator (MNO) account from a source wireless device to a target wireless device, the method comprising:

by an MNO account owner wireless device:

receiving terms and conditions content for transfer of the cellular wireless service from the source wireless device to the target wireless device; and responsive to receipt of an indication of consent to the terms and conditions by the MNO account owner, sending the indication of consent to an MNO back-end system, wherein:

the target wireless device belongs to an MNO account member of the multi-user MNO account other than the MNO account owner, the MNO account owner is authorized to manage the multi-user MNO account, and the MNO account member requires confirmation of authorization by the MNO account owner to transfer the cellular wireless service to the target wireless device.

11. The method of claim 10, further comprising:

by the MNO account owner wireless device:

displaying, via a native operating system user interface of the MNO account owner wireless device, the terms and conditions content.

12. The method of claim 10, wherein:

the target wireless device and the MNO account owner wireless device are manufactured by a same original equipment manufacturer (OEM);

the target wireless device and the MNO account owner wireless device are both registered with a cloud network service of the OEM; and the terms and conditions information is received from the target wireless device via the cloud network service of the OEM.

13. The method of claim 10, wherein:

the target wireless device and the MNO account owner wireless device are manufactured by a same original equipment manufacturer (OEM); and the terms and conditions information is received via a push notification message received from a push notification message server of the OEM.

14. The method of claim 10, further comprising:

by the MNO account owner wireless device:

receiving, from an MNO backend system, a one-time passcode for additional authentication for transfer of the cellular wireless service;

automatically filling the one-time passcode into a reply message; and sending the reply message that includes the one-time passcode to the target wireless device to provide to the MNO backend system.

15. The method of claim 14, wherein:

the target wireless device and the MNO account owner wireless device are manufactured by a same original equipment manufacturer (OEM);

the target wireless device and the MNO account owner wireless device are both registered with a cloud network service of the OEM; and the method further comprises sending the one-time passcode to the target wireless device via the cloud network service of the OEM.

16. A method for multi-factor authentication with owner consent for transfer of cellular wireless service of a multi-user mobile network operator (MNO) account from a source wireless device to a target wireless device, the method comprising:

by an MNO entitlement server:

receiving, from the target wireless device, a first message to transfer the cellular wireless service of the multi-user MNO account, the first message including an indication that the target wireless device belongs to an owner of the multi-user MNO account or to a member of the multi-user MNO account other than the owner of the multi-user MNO account;

sending, to the target wireless device, a first network address of an MNO server from which to obtain terms and conditions content for the transfer of the cellular wireless service;

receiving, from the target wireless device, a second message to obtain a one-time passcode for additional authentication for transfer of the cellular wireless service; and sending, to the target wireless device, a second network address for a second MNO server to which the one-time passcode is to be sent to confirm the additional authentication for transfer of the cellular wireless service, wherein:

the multi-user MNO account comprises the owner of the multi-user MNO account and the member of the multi-user MNO account, the owner of the multi-user MNO account is authorized to manage the multi-user MNO account, and the member of the multi-user MNO account requires confirmation of authorization by the MNO account owner to transfer the cellular wireless service to the target wireless device.

17. The method of claim 16, further comprising:

by the MNO entitlement server:

sending, to an MNO backend system, a request message for the one-time passcode.

18. The method of claim 17, wherein:

the first message from the target wireless device includes a mobile station international subscriber directory number (MSISDN) value for the cellular wireless service to be transferred to the target wireless device; and the request message for the one-time passcode includes the MSISDN value for the cellular wireless service to be transferred to the target wireless device.

19. The method of claim 16, wherein the first message to transfer the cellular wireless service of the multi-user MNO account further comprises an indication of support for displaying terms and conditions via a native operating system user interface of the target wireless device.

20. The method of claim 16, further comprising:

by the MNO entitlement server:

sending, to the target wireless device, with the first network address of the MNO server from which to obtain terms and conditions content for the transfer of the cellular wireless service, when the first message indicates that the target wireless device belongs to the member of the MNO account other than the owner of the multi-user MNO account, a relay flag indicating that target wireless device should forward the first network address to a wireless device of the owner of the multi-user MNO account for acceptance of the terms and conditions.

* * * * *